(12) United States Patent
Dutta et al.

(10) Patent No.: US 11,576,070 B2
(45) Date of Patent: Feb. 7, 2023

(54) CHANNEL MEASUREMENTS AND CONCURRENT MESSAGES FOR USER EQUIPMENT WITH MULTIPLE TRANSMIT-RECEIVE POINTS

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/330,017

(22) Filed: May 25, 2021

(65) Prior Publication Data

US 2021/0377768 A1    Dec. 2, 2021

Related U.S. Application Data

(60) Provisional application No. 63/030,720, filed on May 27, 2020.

(51) Int. Cl.
*H04W 24/10* (2009.01)
*H04W 72/02* (2009.01)
(Continued)

(52) U.S. Cl.
CPC ............ *H04W 24/10* (2013.01); *H04L 5/005* (2013.01); *H04W 72/02* (2013.01);
(Continued)

(58) Field of Classification Search
CPC . H04W 24/10; H04W 72/02; H04W 72/0406; H04W 72/0446; H04W 76/14;
(Continued)

(56) References Cited

U.S. PATENT DOCUMENTS

| 2018/0206140 A1 | 7/2018 | Panteleev et al. |
| 2020/0045655 A1* | 2/2020 | Joseph ................. H04B 17/309 |
| 2020/0145867 A1 | 5/2020 | Tseng et al. |

FOREIGN PATENT DOCUMENTS

WO    WO-2021229026 A1 *  11/2021

OTHER PUBLICATIONS

Huawei, et al., "Introduction of 5G V2X with NR Sidelink," 3GPP Draft, 3GPP TSG-RAN2 WG2 Meeting #108, RP-200346, R2-2001966, 3rd Generation Partnership Project (3GPP), Mobile Competence Centre, 650, Route Des Lucioles, F-06921, Sophia-Antipolis Cedex, France, vol. RAN WG2. No. Reno, Nevada, Nov. 18, 2019-Nov. 22, 2019, Mar. 12, 2020 (Mar. 12, 2020), XP051865668, 490 pages, Retrieved from the Internet: URL: https://ftp.3gpp.org/3guinternal/3GPP_Ultimate_CRPacks/RP-200346.zip38331_CR1493r1_(Rel-16)_R2-2001966.docx [retrieved on Mar. 12, 2020], the whole document.

(Continued)

*Primary Examiner* — Hoon J Chung
(74) *Attorney, Agent, or Firm* — Changwoo Yang

(57) ABSTRACT

Various aspects of the present disclosure generally relate to wireless communication. In some aspects, a first user equipment (UE) may transmit, to a second UE on a sidelink channel, a configuration message that includes an indication of a first set of reference signals associated with a first transmit-receive point (TRP) of the first UE, an indication of a second set of reference signals associated with a second TRP of the first UE, and an indication to refrain from combining measurements based at least in part on the first set of reference signals with measurements based at least in part on the second set of reference signals. The first UE may further transmit, using the first TRP of the first UE, the first set of reference signals, and transmit, using the second TRP (Continued)

of the first UE, the second set of reference signals. Numerous other aspects are provided.

30 Claims, 12 Drawing Sheets

(51) Int. Cl.
*H04W 72/04* (2009.01)
*H04L 5/00* (2006.01)
*H04W 92/18* (2009.01)

(52) U.S. Cl.
CPC ... *H04W 72/0406* (2013.01); *H04W 72/0446* (2013.01); *H04W 92/18* (2013.01)

(58) Field of Classification Search
CPC ...... H04W 92/18; H04L 5/005; H04L 5/0057; H04L 5/0051; H04L 5/0094; H04B 7/024
See application file for complete search history.

(56) References Cited

OTHER PUBLICATIONS

International Search Report and Written Opinion—PCT/US2021/034169—ISA/EPO—dated Sep. 15, 2021.

\* cited by examiner

CHANNEL MEASUREMENTS AND CONCURRENT MESSAGES FOR USER EQUIPMENT WITH MULTIPLE TRANSMIT-RECEIVE POINTS

CROSS-REFERENCE TO RELATED APPLICATION

This Patent Application claims priority to U.S. Provisional Patent Application No. 63/030,720, filed on May 27, 2020, entitled "CHANNEL MEASUREMENTS AND CONCURRENT MESSAGES FOR USER EQUIPMENT WITH MULTIPLE TRANSMIT-RECEIVE POINTS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for channel measurements and concurrent messages for user equipment with multiple transmit-receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first user equipment (UE), may include transmitting, to a second UE on a sidelink channel, a configuration message, wherein the configuration message includes an indication of a first set of reference signals associated with a first transmit-receive point (TRP) of the first UE, an indication of a second set of reference signals associated with a second TRP of the first UE, and an indication to the second UE to refrain from combining measurements based at least in part on the first set of reference signals with measurements based at least in part on the second set of reference signals; transmitting, using the first TRP of the first UE, the first set of reference signals to the second UE on the sidelink channel; and transmitting, using the second TRP of the first UE, the second set of reference signals to the second UE on the sidelink channel.

In some aspects, a method of wireless communication, performed by a first UE, may include receiving, from a second UE on a sidelink channel, a configuration message, wherein the configuration message includes an indication of a first set of reference signals associated with a first TRP of the second UE, an indication of a second set of reference signals associated with a second TRP of the second UE, and an indication to refrain from combining measurements based at least in part on the first set of reference signals with measurements based at least in part on the second set of reference signals; measuring the first set of reference signals from the second UE on the sidelink channel; and measuring the second set of reference signals from the second UE on the sidelink channel, wherein measurements based at least in part on the second set of reference signals are not combined with measurements based at least in part on the first set of reference signals.

In some aspects, a first UE for wireless communication may include a memory and one or more processors coupled to the memory. The memory and the one or more processors may be configured to transmit, to a second UE on a sidelink channel, a configuration message, wherein the configuration message includes an indication of a first set of reference signals associated with a first TRP of the first UE, an indication of a second set of reference signals associated with a second TRP of the first UE, and an indication to the second UE to refrain from combining measurements based at least in part on the first set of reference signals with measurements based at least in part on the second set of reference signals; transmit, using the first TRP of the first UE, the first set of reference signals to the second UE on the sidelink channel; and transmit, using the second TRP of the first UE, the second set of reference signals to the second UE on the sidelink channel.

In some aspects, a first UE for wireless communication may include a memory and one or more processors coupled to the memory. The memory and the one or more processors may be configured to receive, from a second UE on a sidelink channel, a configuration message, wherein the configuration message includes an indication of a first set of reference signals associated with a first TRP of the second UE, an indication of a second set of reference signals associated with a second TRP of the second UE, and an indication to refrain from combining measurements based at least in part on the first set of reference signals with measurements based at least in part on the second set of reference signals; measure the first set of reference signals from the second UE on the sidelink channel; and measure the second set of reference signals from the second UE on the sidelink channel, wherein measurements based at least in part on the second set of reference signals are not combined with measurements based at least in part on the first set of reference signals.

In some aspects, a non-transitory computer-readable medium may store one or more instructions for wireless communication. The one or more instructions, when executed by one or more processors of a first UE, may cause the first UE to transmit, to a second UE on a sidelink channel, a configuration message, wherein the configuration message includes an indication of a first set of reference signals associated with a first TRP of the first UE, an indication of a second set of reference signals associated with a second TRP of the first UE, and an indication to the second UE to refrain from combining measurements based at least in part on the first set of reference signals with measurements based at least in part on the second set of reference signals; transmit, using the first TRP of the first UE, the first set of reference signals to the second UE on the sidelink channel; and transmit, using the second TRP of the first UE, the second set of reference signals to the second UE on the sidelink channel.

In some aspects, a non-transitory computer-readable medium may store one or more instructions for wireless communication. The one or more instructions, when executed by one or more processors of a first UE, may cause the first UE to receive, from a second UE on a sidelink channel, a configuration message, wherein the configuration message includes: an indication of a first set of reference signals associated with a first TRP of the second UE, an indication of a second set of reference signals associated with a second TRP of the second UE, and an indication to refrain from combining measurements based at least in part on the first set of reference signals with measurements based at least in part on the second set of reference signals; measure the first set of reference signals from the second UE on the sidelink channel; and measure the second set of reference signals from the second UE on the sidelink channel, wherein measurements based at least in part on the second set of reference signals are not combined with measurements based at least in part on the first set of reference signals.

In some aspects, an apparatus for wireless communication may include means for transmitting, to a UE on a sidelink channel, a configuration message, wherein the configuration message includes an indication of a first set of reference signals associated with a first TRP of the apparatus, an indication of a second set of reference signals associated with a second TRP of the apparatus, and an indication to the UE to refrain from combining measurements based at least in part on the first set of reference signals with measurements based at least in part on the second set of reference signals; means for transmitting, using the first TRP of the apparatus, the first set of reference signals to the UE on the sidelink channel; and means for transmitting, using the second TRP of the apparatus, the second set of reference signals to the UE on the sidelink channel.

In some aspects, an apparatus for wireless communication may include means for receiving, from a UE on a sidelink channel, a configuration message, wherein the configuration message includes an indication of a first set of reference signals associated with a first TRP of the UE, an indication of a second set of reference signals associated with a second TRP of the UE, and an indication to refrain from combining measurements based at least in part on the first set of reference signals with measurements based at least in part on the second set of reference signals; means for measuring the first set of reference signals from the UE on the sidelink channel; and means for measuring the second set of reference signals from the UE on the sidelink channel, wherein measurements based at least in part on the second set of reference signals are not combined with measurements based at least in part on the first set of reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
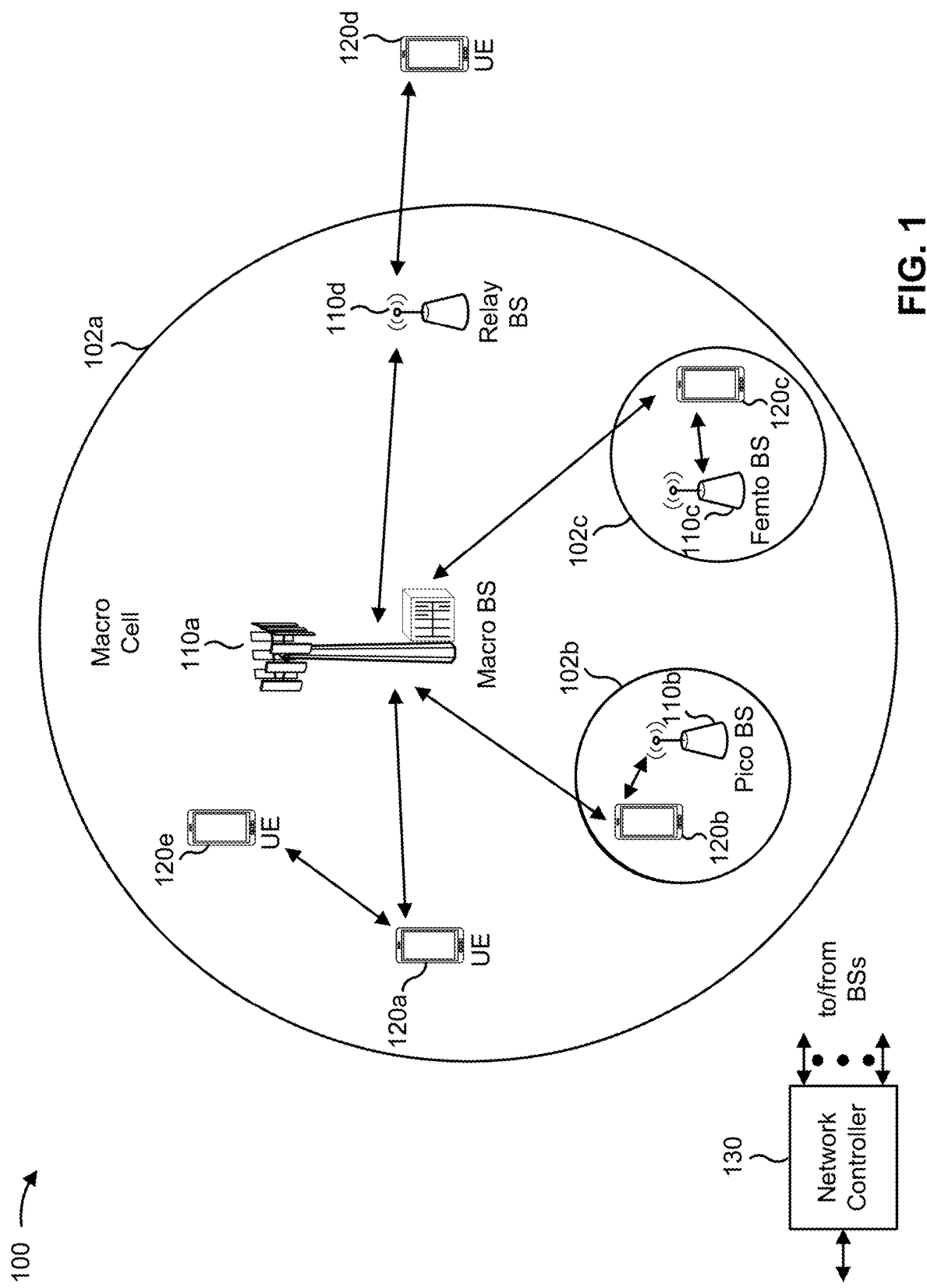
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
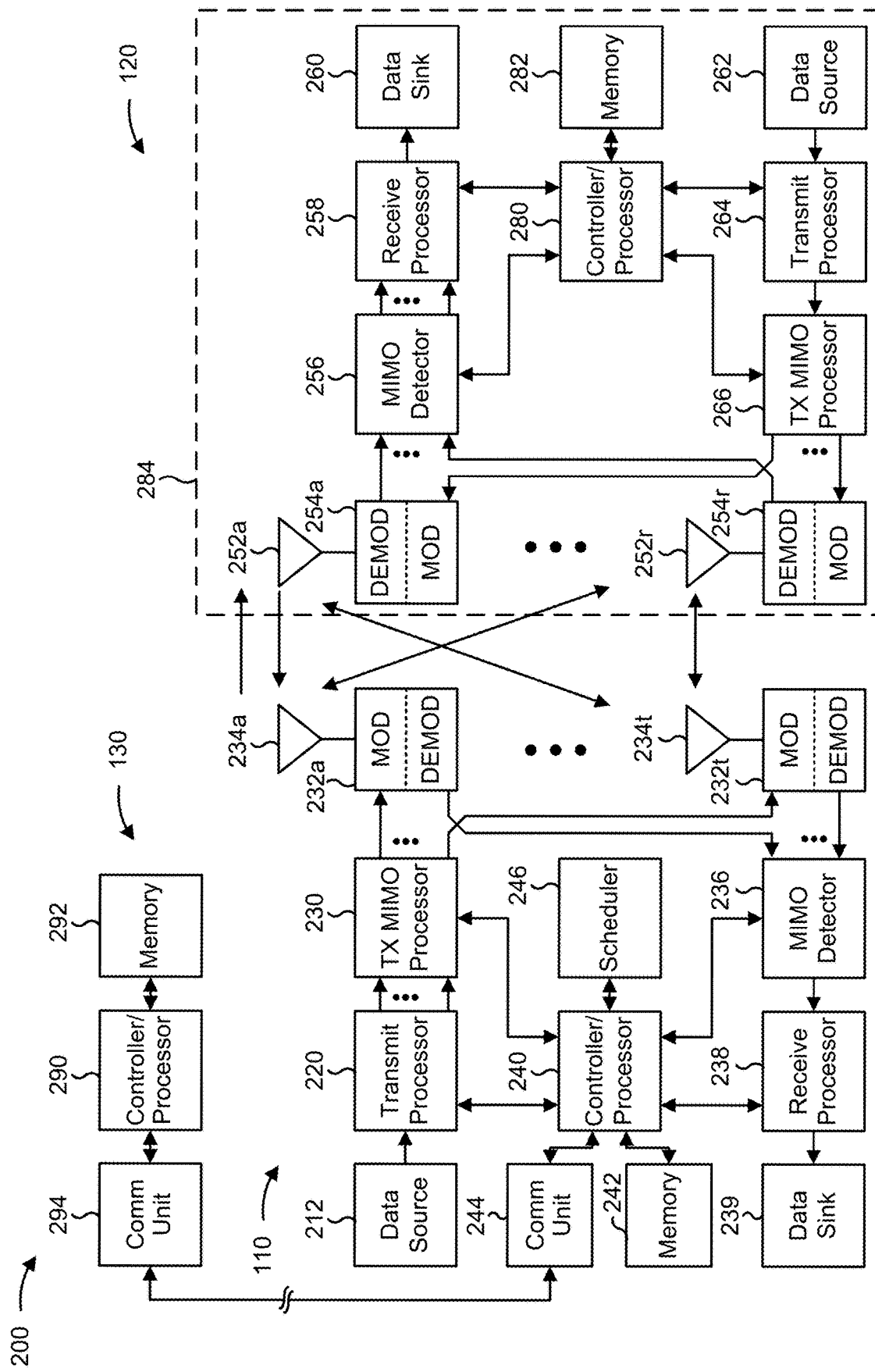
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6-10).

Controller/processor 240 of base station 110, controller/processor 280 of UE 120, and/or any other component(s) of FIG. 2 may perform one or more techniques associated with channel measurements and concurrent messages for UEs with multiple TRPs, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a first UE (e.g., the UE 120a) may include means for transmitting, to a second UE (e.g., the UE 120e) on a sidelink channel, a configuration message, wherein the configuration message includes an indication of a first set of reference signals associated with a first TRP of the first UE, an indication of a second set of reference signals associated with a second TRP of the first UE, and an indication to the second UE to refrain from combining measurements based at least in part on the first set of reference signals with measurements based at least in part on the second set of reference signals; means for transmitting, using the first TRP of the first UE, the first set of reference signals to the second UE on the sidelink channel; and/or means for transmitting, using the second TRP of the first UE, the second set of reference signals to the second UE on the sidelink channel. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a first UE (e.g., the UE 120e) may include means for receiving, from a second UE (e.g., the UE 120a) on a sidelink channel, a configuration message, wherein the configuration message includes an indication of a first set of reference signals associated with a first TRP of the second UE, an indication of a second set of reference signals associated with a second TRP of the second UE, and an indication to refrain from combining measurements based at least in part on the first set of reference signals with measurements based at least in part on the second set of reference signals; means for measuring the first set of reference signals from the second UE on the sidelink channel; and/or means for measuring the second set of reference signals from the second UE on the sidelink channel, wherein measurements based at least in part on the second set of reference signals are not combined with measurements based at least in part on the first set of reference signals. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
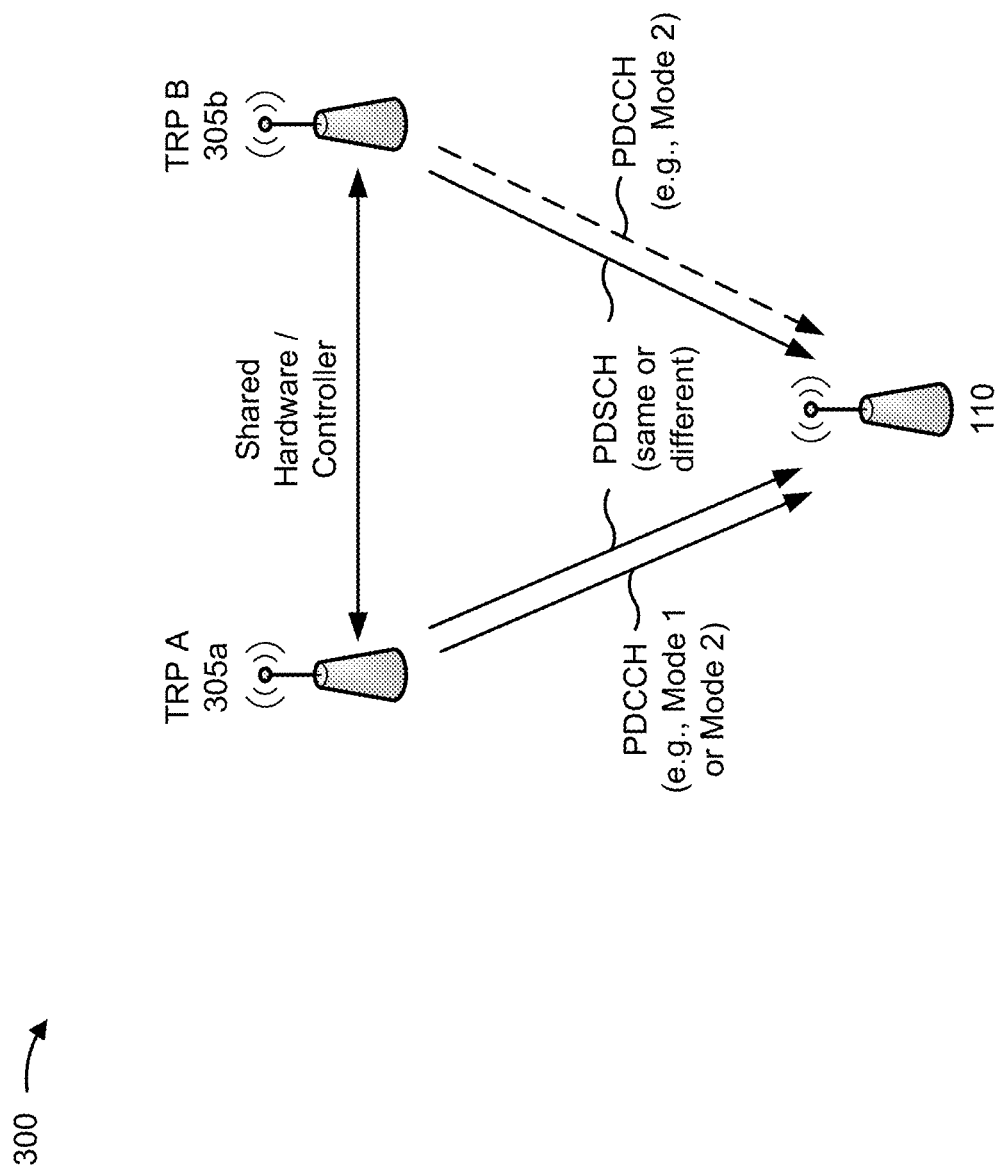
FIG. 3 is a diagram illustrating an example of a multi-transmit-receive point (multi-TRP) UE, in accordance with the present disclosure.

FIG. 3 is a diagram illustrating an example 300 of a multi-TRP UE (sometimes referred to as a multi-panel UE), in accordance with the present disclosure. As shown in FIG. 3, one or more TRPs 305 may communicate with the same base station 110.

A TRP 305 may correspond to a UE 120 described above in connection with FIG. 1. For example, multiple TRPs 305 may be included in a single UE 120 and may share hardware circuitry, a hardware controller and/or other hardware components. In some aspects, different TRPs 305 may include different antennas (also referred to as panels) on the UE 120. Accordingly, a TRP 305 may be referred to as a cell, a panel, an antenna array, or an array, among other examples.

In some aspects, multiple TRPs 305 may transmit communications (e.g., the same communication or different communications) in the same transmission time interval (TTI) (e.g., a slot, a mini-slot, a subframe, a symbol, and/or another portion of a time domain) or different TTIs using different quasi-co-location (QCL) relationships (e.g., different spatial parameters, different transmission configuration indicator (TCI) states, different precoding parameters, different beamforming parameters, and/or other parameters). In some aspects, a TCI state may be used to indicate one or more QCL relationships. A TRP 305, when included in one or more UEs 120, may be configured to individually (e.g., using dynamic selection) or jointly (e.g., using joint transmission with one or more other TRPs 305) communicate with a base station 110. Similarly, a TRP 305, when included in one or more UEs 120, may be configured to individually (e.g., using dynamic selection) or jointly (e.g., using joint transmission with one or more other TRPs 305) serve traffic over a sidelink channel to another UE, as described below in connection with FIGS. 4-5.

The multiple TRPs 305 (shown as TRP A and TRP B), when included in one or more UEs 120, may communicate with the same base station 110 in a coordinated manner (e.g., using coordinated multipoint transmissions) to improve reliability and/or increase throughput. Similarly, the multiple TRPs 305, when included in one or more UEs 120, may communicate over a sidelink channel to another UE in a coordinated manner (e.g., using coordinated multipoint transmissions) to improve reliability and/or increase throughput. The TRPs 305 may coordinate such communications via an interface between the TRPs 305 (e.g., a shared hardware controller and/or other shared hardware circuitry). The different TRPs 305 may communicate with the base station 110 using different QCL relationships (e.g., different TCI states), different DMRS ports, and/or different layers (e.g., of a multi-layer communication).

In a first multi-TRP reception mode (e.g., Mode 1 in FIG. 3), a single physical downlink control channel (PDCCH) may be used to schedule downlink data communications for a single physical downlink shared channel (PDSCH). In this case, multiple TRPs 305 (e.g., TRP A and TRP B) may receive communications from the base station 110 on the same PDSCH. For example, a communication may be transmitted using a single codeword with different spatial layers for different TRPs 305 (e.g., where one codeword maps to a first set of layers transmitted by a first TRP 305a and maps to a second set of layers transmitted by a second TRP 305b). As another example, a communication may be transmitted using multiple codewords, where different codewords are received by different TRPs 305 (e.g., using different sets of layers). In either case, different TRPs 305 may use different QCL relationships (e.g., different TCI states) for different DMRS ports corresponding to different layers. For example, a first TRP 305a may use a first QCL relationship or a first TCI state for a first set of DMRS ports corresponding to a first set of layers, and a second TRP 305b may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or another DCI format) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP reception) or multiple TCI states (for multi-TRP reception as discussed here) in this multi-TRP reception mode (also referred to as "Mode 1").

In a second multi-TRP reception mode (e.g., Mode 2 in FIG. 3), multiple PDCCHs may be used to schedule downlink data communications for multiple corresponding PDSCHs (e.g., one PDCCH for each PDSCH). In this case, a first PDCCH may schedule a first codeword to be received by a first TRP 305a, and a second PDCCH may schedule a second codeword to be received by a second TRP 305b. Furthermore, first DCI (e.g., received by the first TRP 305) may schedule a first PDSCH communication associated with a first set of DMRS ports with a first QCL relationship (e.g., indicated by a first TCI state) for the first TRP 305a, and second DCI (e.g., received by the second TRP 305) may schedule a second PDSCH communication associated with a second set of DMRS ports with a second QCL relationship (e.g., indicated by a second TCI state) for the second TRP 305b. In this case, DCI (e.g., having DCI format 1_0, DCI format 1_1, and/or the like) may indicate a corresponding TCI state for a TRP 305 corresponding to the DCI. The TCI field of a DCI indicates the corresponding TCI state (e.g., the TCI field of the first DCI indicates the first TCI state and the TCI field of the second DCI indicates the second TCI state).

Although described above with respect to communicating with one or more base stations 110, the description applies equally to the multiple TRPs 305 communicating on a sidelink channel to another UE. As indicated above, FIG. 3 is provided as an example. Other examples may differ from what is described with respect to FIG. 3.

Figure 4:
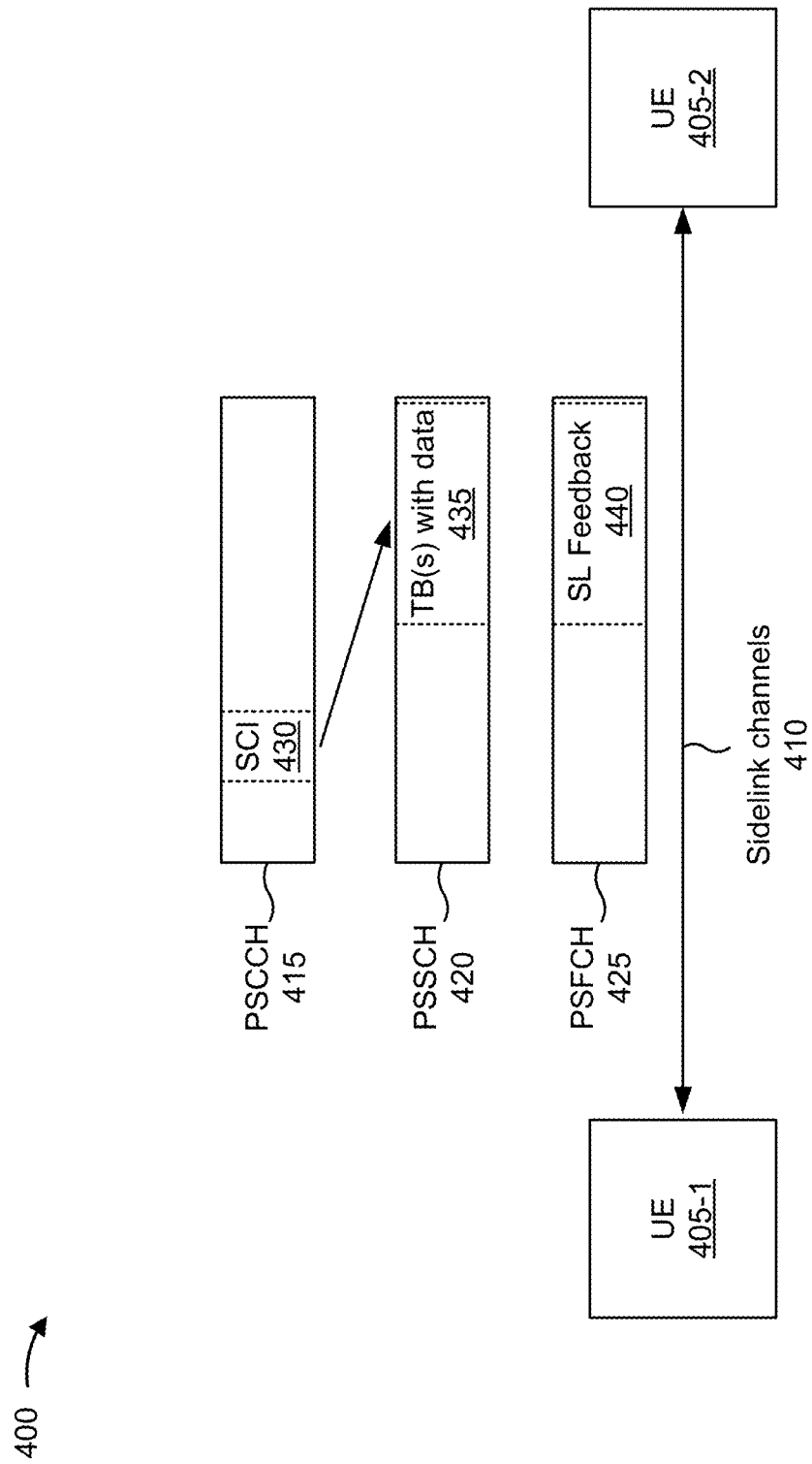
FIG. 4 is a diagram illustrating an example of sidelink communications, in accordance with the present disclosure.

FIG. 4 is a diagram illustrating an example 400 of sidelink communications, in accordance with the present disclosure. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or vehicle-to-pedestrian (V2P) communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of TTIs (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a PDCCH and/or a physical uplink control channel (PUCCH) used for cellular communications with a base station 110 via an access link or an access channel. The PSSCH 420 may be used to communicate data, similar to a PDSCH and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative-acknowledgement (ACK/NACK) information), transmit power control (TPC), and/or a scheduling request (SR).

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
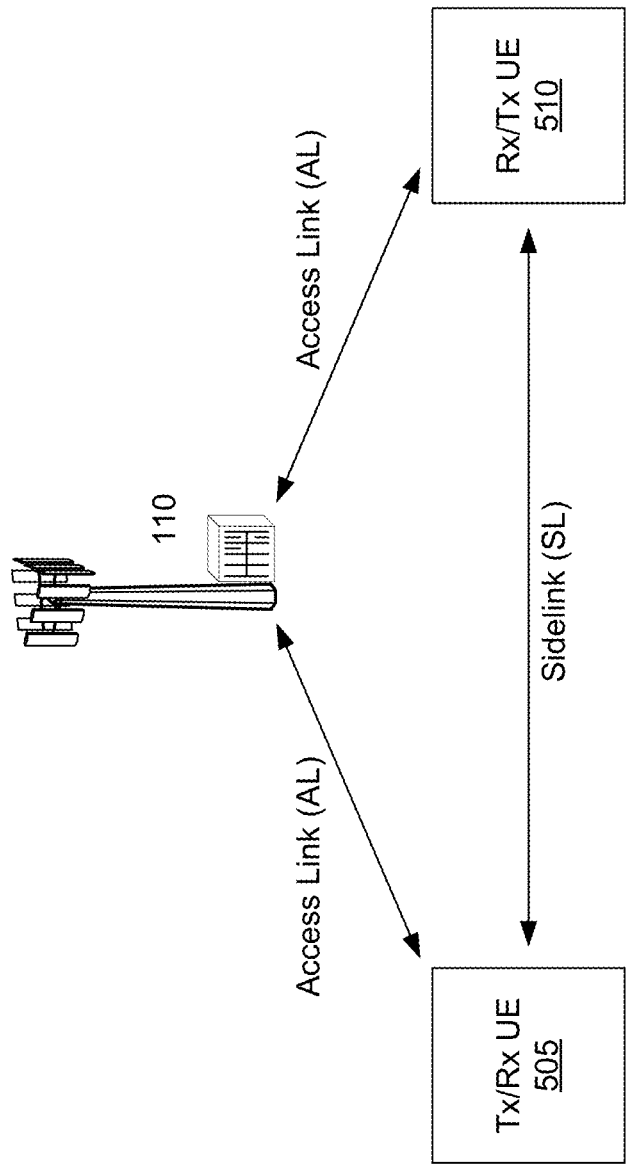
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure. As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

In some cases, as described above, a UE may include multiple TRPs. The TRPs may be separated by a few meters (e.g., like front and rear panels of a car or other vehicle) or may be separated by tens of meters (e.g., like in trucks, trailers, and/or other large UEs). For multi-TRP UEs, some TRPs may have greater signal reliability and/or strength than other TRPs for transmitting and receiving depending on environmental factors (e.g., intervening objects that interfere with transmissions to and from one TRP but not to another). Additionally, or alternatively, some TRPs may have greater signal reliability and/or strength than other TRPs for transmitting or receiving depending on different distances between the TRPs and an intended recipient of the transmitting or a sender associated with the receiving, respectively. For example, one TRP may be closer to a peer UE and/or a base station than another TRP. These disparities in reliability and/or strength may be particularly large when the multi-TRP UE is communicating on a sidelink channel to a peer UE.

Techniques and apparatuses described herein enable a multi-TRP UE (e.g., the UE 120*a* of FIGS. 6-8, described below) to measure separate indicators of signal strength (such as RSRP parameters, CQI parameters, signal-to-interference-and-noise ratios (SINRs), and/or other parameters) for the TRPs. By measuring separate indicators, the UE 120*a* may obtain a more accurate measurement of signal quality and/or reliability from the TRPs. Accordingly, the UE 120*a* may use the indicators to coordinate simultaneous transmission to multiple peer UEs (e.g., UEs 120*b* and 120*c* of FIG. 7, as described below), which reduces latency and efficiently reuses network resources to reduce overhead. Additionally, or alternatively, the UE 120*a* may use the indicators to coordinate combined transmission to a single peer UE (e.g., UE 120*b* of FIG. 8, as described below), which increases reliability and signal strength. In some aspects, the UE 120*a* may use combined transmission to additionally, or alternatively, enable a higher MCS in order to conserve network resources during transmission.

Figure 6:
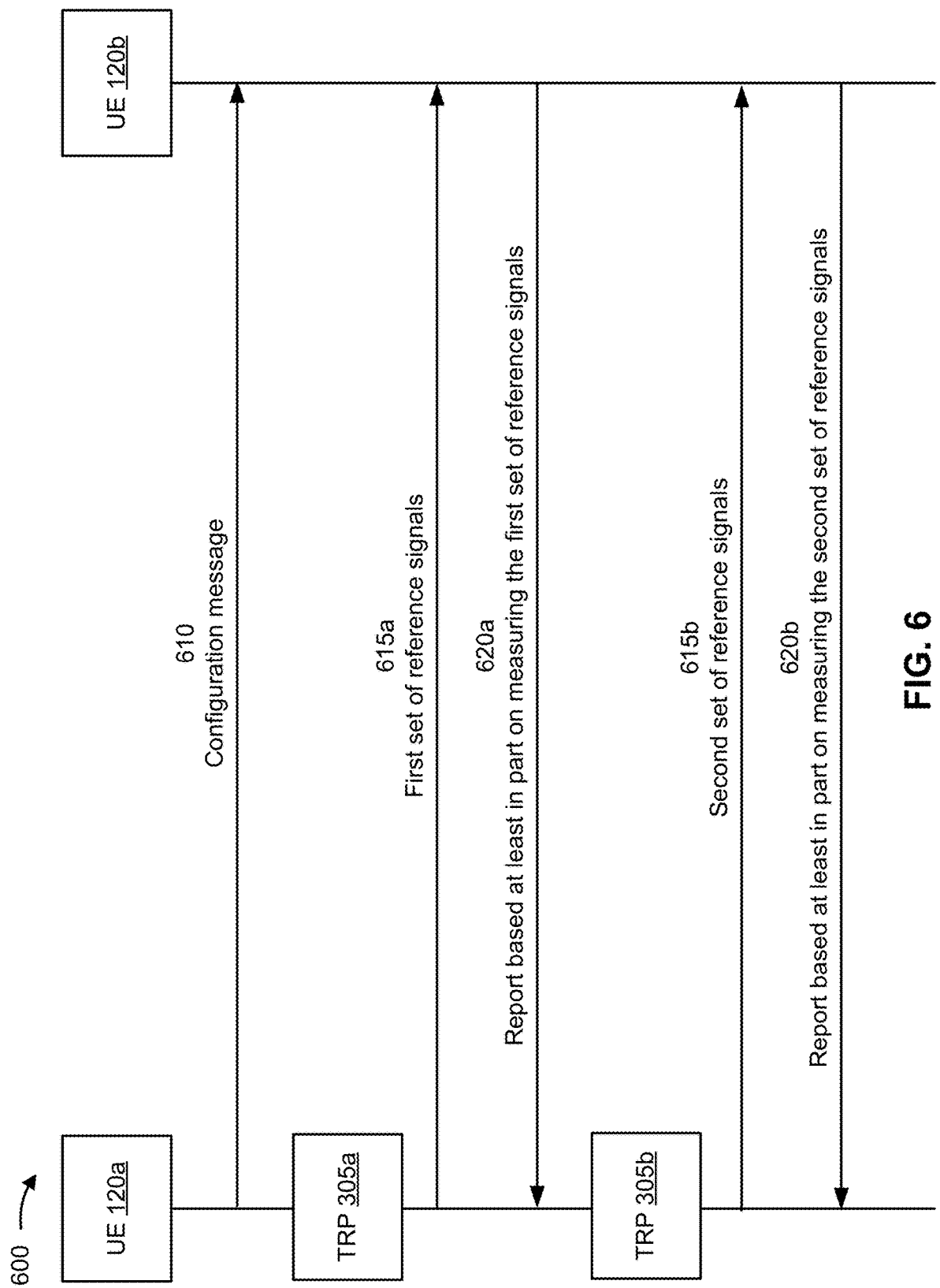
FIG. 6 is a diagram illustrating an example of measuring signal quality from a multi-TRP UE, in accordance with the present disclosure.

FIG. 6 is a diagram illustrating an example 600 of measuring signal quality from a multi-TRP UE 120*a*, in accordance with the present disclosure. As shown in FIG. 6, example 600 includes a UE 120*a* with a plurality of TRPs (e.g., first TRP 305*a* and second TRP 305*b*) in communication (e.g., on a sidelink channel, as described above in connection with FIGS. 4-5) with a second UE 120*b*. Although the description below will focus on the UE 120*a* with two TRPs 305*a* and 305*b*, the description similarly applies to a UE 120*a* with additional TRPs (e.g., three TRPs, four TRPs, and so on).

As shown by reference number 610, the multi-TRP UE 120*a* may transmit, and the second UE 120*b* may receive, on the sidelink channel, a configuration message. The configuration message may include an indication of a first set of reference signals associated with the first TRP 305*a* of the multi-TRP UE 120*a*, an indication of a second set of reference signals associated with the second TRP 305*b* of the multi-TRP UE 120*a*, and an indication to the second UE 120*b* to refrain from combining measurements, based at least in part on the first set of reference signals, with measurements based at least in part on the second set of reference signals.

In some aspects, the multi-TRP UE 120*a* may transmit the configuration message using the first TRP 305*a* and/or the second TRP 305*b*. Accordingly, as shown in FIG. 6, the second UE 120*b* may receive the configuration message from the multi-TRP UE 120*a* on the sidelink channel.

In some aspects, the configuration message may be included in a radio resource control (RRC) message. Additionally, or alternatively, the configuration message may be included in SCI.

In some aspects, the indication of the first set of reference signals may include at least one first measurement gap offset for the first set of reference signals and at least one first measurement gap period for the first set of reference signals. Additionally, or alternatively, the indication of the second set of reference signals includes at least one second measurement gap offset for the second set of reference signals and at least one second measurement gap period for the second set of reference signals.

Accordingly, the at least one first measurement gap offset may be different from the at least one second measurement gap offset. For example, for the two TRPs 305*a* and 305*b* depicted in FIG. 6, the indication of the first set of reference signals may include an offset and period (2,10), and the indication of the second set of reference signals may include an offset and period (5,10). These indications may be separate from each other or may be combined in a list (e.g., {(2,10), (5,10)}) for encoding in a message. In this example, the offsets indicate that the second and fifth subframes are for reference signal measurement (e.g., channel state information reference signal (CSI-RS) measurement). As used herein, a "subframe" may refer a portion of a radio frame within an LTE, 5G, or other wireless communication structure. In some aspects, a subframe may include one or more slots, where each slot has one or more symbols. Moreover, a "symbol" may refer to an OFDM symbol or other similar symbol within a slot. Accordingly, one TRP (e.g., the first TRP 305*a*) may transmit the first set of reference signals in each second subframe, and the other TRP (e.g., the second TRP 305*b*) may transmit the second set of reference signals in each fifth subframe.

In this example, the at least one first measurement gap period includes a same period as the at least one second measurement gap period. As an alternative, the at least one first measurement gap period may include a different period than the at least one second measurement gap period. For example, the indication of the first set of reference signals may include an offset and period (2,10), and the indication of the second set of reference signals may include an offset and period (5,20). The at least one first measurement gap period and the at least one second measurement gap period may be selected to avoid collision (e.g., by selecting periods such that a modulo of the at least one second period and the at least one first period is zero, as shown in the example above).

As an alternative, the multi-TRP UE 120*a* may prioritize the first set of reference signals over the second set of reference signals or may prioritize the second set of reference signals over the first set of reference signals, such that only the first set of reference signals or the second set of reference signals, respectively, are sent during any subframe (or slot) in which a collision is expected. In some aspects, the TRPs may also measure each other's reference signals during transmission (e.g., as described below in connection with FIG. 8).

The indication may additionally, or alternatively, include information identifying at least one first port for the first set of reference signals and at least one second port for the second set of reference signals. Accordingly, the first set of reference signals and the second set of reference signals may be orthogonal in frequency in addition to or in lieu of being orthogonal in time, as described above.

Accordingly, as described above, the first set of reference signals and the second set of reference signals may be multiplexed within one or more subframes or slots in a measurement period. In some aspects, the first set of reference signals and the second set of reference signals may be multiplexed using time division multiplexing, code division multiplexing, frequency division multiplexing, or a combination thereof.

As shown by reference number 615a, the multi-TRP UE 120a may transmit, using the first TRP 305a of the UE 120a, the first set of reference signals to the second UE 120b on the sidelink channel. For example, the first set of reference signals may include CSI-RSs, as described above.

Accordingly, the second UE 120b may measure the first set of reference signals from the multi-TRP UE 120a on the sidelink channel. For example, the second UE 120b may determine one or more indicators of signal quality and/or strength based on the first set of reference signals.

As shown by reference number 615b, the multi-TRP UE 120a may transmit, using the second TRP 305b of the UE 120a, the second set of reference signals to the second UE 120b on the sidelink channel. For example, the second set of reference signals may include CSI-RSs, as described above.

Accordingly, the second UE 120b may measure the second set of reference signals from the multi-TRP UE 120a on the sidelink channel. For example, the second UE 120b may determine one or more indicators of signal quality and/or strength based on the first set of reference signals.

As described above, the second UE 120b does not combine measurements, based at least in part on the second set of reference signals, with measurements based at least in part on the first set of reference signals. For example, the configuration message from the multi-TRP UE 120a may include at least one bit or other information that indicates to the second UE 120b not to combine the measurements, based at least in part on the second set of reference signals, with the measurements based at least in part on the first set of reference signals.

As shown by reference number 620, the second UE 120b may transmit, and the multi-TRP UE 120a may receive, at least one report calculated by the second UE 120b. In some aspects, the second UE 120b may transmit the at least one report based at least in part on measuring the first set of reference signals and measuring the second set of reference signals. Accordingly, the multi-TRP UE 120a may receive the at least one report based at least in part on transmitting the first set of reference signals and transmitting the second set of reference signals. As shown in FIG. 6, the multi-TRP UE 120a may receive the at least one report using the first TRP 305a (shown by reference number 620a) and/or the second TRP 305b (shown by reference number 620b).

In some aspects, the at least one report includes at least one of a first SINR, a first RSRP, or a combination thereof for the first set of reference signals, and at least one of a second SINR, a second RSRP, or a combination thereof for the second set of reference signals. Additionally, or alternatively, the at least one report may include signal-to-interference ratios (SIRs) and/or other measurements.

In some aspects, the at least one report may include a first report based at least in part on measuring the first set of reference signals and a second report based at least in part on measuring the second set of reference signals. For example, the second UE 120b may generate a first CQI report based at least in part on measuring the first set of reference signals and a second CQI report based at least in part on measuring the second set of reference signals. Accordingly, the second UE 120b may transmit two or more reports to the multi-TRP UE 120a, where each report is associated with a different TRP.

As an alternative, the at least one report may include a report with an index relating a first portion of the report to the first set of reference signals and a second portion of the report to the second set of reference signals. For example, the second UE 120b may generate a single CQI report with measurements included in a list with identifiers that correspond to different TRPs of the multi-TRP UE 120a. For example, an index of TRPs may map the identifiers included in the list of measurements to corresponding TRPs.

By configuring measurements of reference signals from the TRPs separately, the multi-TRP UE 120a may receive more accurate reporting of signal quality from the TRPs. Moreover, the multi-TRP UE 120a may use the reports generated as described above to reduce latency and overhead with simultaneous transmission (e.g., as described below in connection with FIG. 7) and/or to improve signal quality and/or reliability with combined transmission (e.g., as described below in connection with FIG. 8).

As indicated above, FIG. 6 is provided as an example. Other examples may differ from what is described with respect to FIG. 6.

Figure 7:
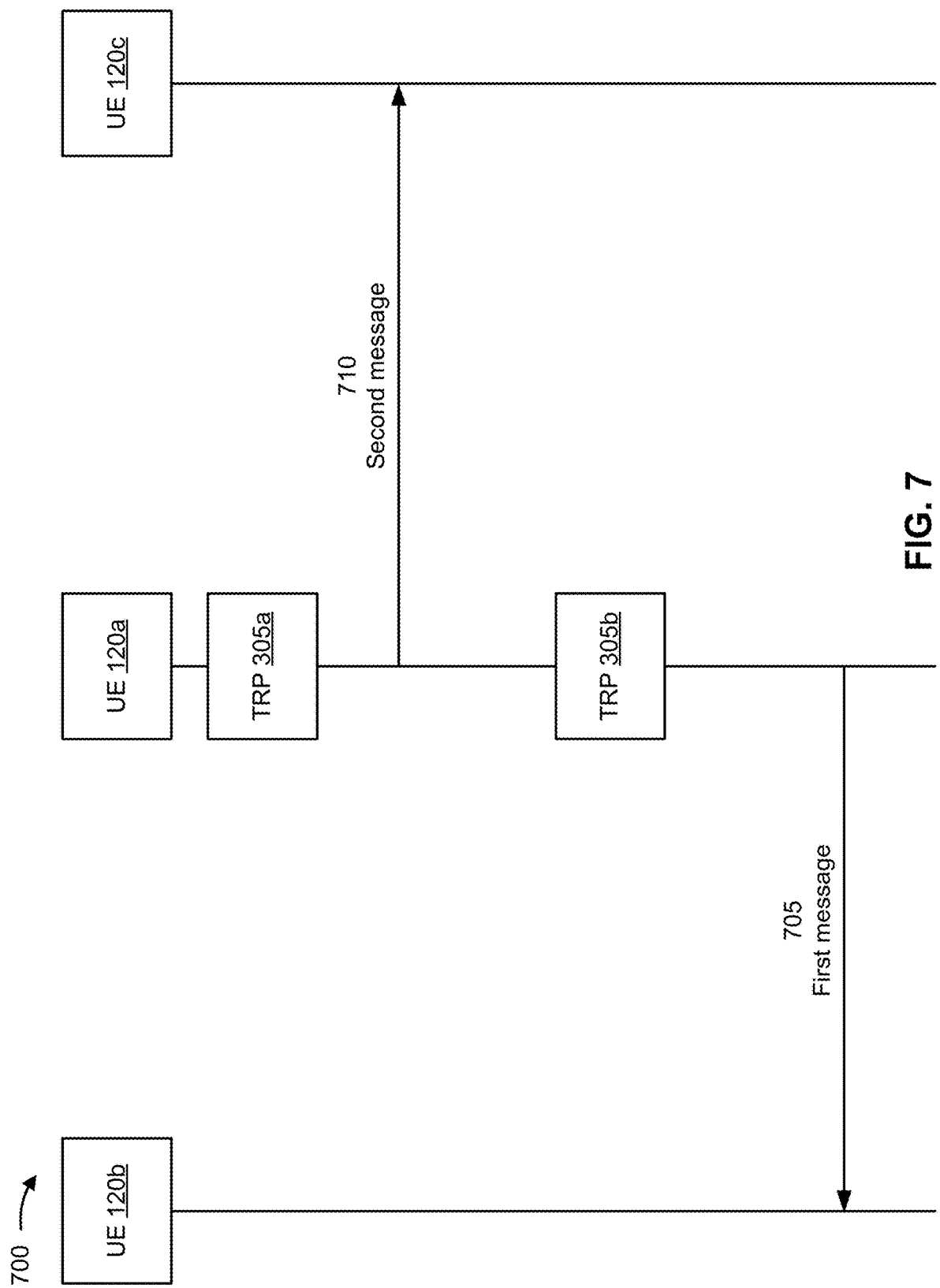
FIG. 7 is a diagram illustrating an example of simultaneous transmission from a multi-TRP UE, in accordance with the present disclosure.

FIG. 7 is a diagram illustrating an example 700 of simultaneous transmission from a multi-TRP UE 120a, in accordance with the present disclosure. As shown in FIG. 7, example 700 includes a UE 120a with a plurality of TRPs (e.g., first TRP 305a and second TRP 305b) in communication (e.g., on a sidelink channel, as described above in connection with FIGS. 4-5) with a second UE 120b and a third UE 120c. Although the description below will focus on the UE 120a with two TRPs 305a and 305b, the description similarly applies to a UE 120a with additional TRPs (e.g., three TRPs, four TRPs, and so on).

In example 700, the multi-TRP UE 120a may determine, based at least in part on at least one report, that the multi-TRP UE 120a is capable of simultaneously transmitting to a second UE 120b and the third UE 120c. For example, the UE 120a may receive the at least one report as described above in connection with FIG. 6.

In some aspects, determining that the multi-TRP UE 120a is capable of simultaneously transmitting to the second UE 120b and the third UE 120c may include determining that at least one of a first SIR associated with the second UE 120b, a second SIR associated with the third UE 120c, or a combination thereof satisfies a condition. For example, the multi-TRP UE 120a may determine whether the first SIR, the second SIR, a combination of the first SIR and the second SIR, and/or a minimum (or maximum) of the first SIR and the second SIR satisfies a threshold.

In one example, the second UE 120b may have measured a signal strength of −44 dBm based at least in part on a first set of reference signals from the first TRP 305a and a signal strength of −60 dBm based at least in part on a second set of reference signals from the second TRP 305b. In addition, the third UE 120c may have measured a signal strength of −58 dBm based at least in part on a first set of reference signals from the first TRP 305a and a signal strength of −45 dBm based at least in part on a second set of reference signals from the second TRP 305b. Accordingly, the multi-TRP UE 120a may determine (e.g., based at least in part on the measurements described above and/or from the at least one report) that a first SIR associated with the second UE 120b is 14 dB and a second SIR associated with the third UE 120c is 15 dB. In this example, the multi-TRP UE 120a may determine that the multi-TRP UE 120a is capable of simultaneous transmission to the second UE 120b and the third UE 120c (e.g., when the condition is a minimum SIR of 14 dB or less).

In some aspects, determining that the multi-TRP UE 120a is capable of simultaneously transmitting to the second UE 120b and the third UE 120c may include adding the second UE 120b and the third UE 120c as a set to a list of UEs suitable for simultaneous transmission. For example, the multi-TRP 120a may maintain the list of sets of UEs to which simultaneous transmission is possible.

In some aspects, the multi-TRP UE 120a may maintain the list using an iterative process. For example, the multi-TRP UE 120a may select a minimum SIR and/or other condition based at least in part on a measure of signal strength. Based at least in part on the condition, the multi-TRP UE 120a may add pairs of UEs (or other sets including three or more UEs) to the list based at least in part on satisfying the condition (e.g., by having a first SIR and a second SIR, as described above, that satisfy the minimum SIR). The multi-TRP UE 120a may add sets of UEs to the list by modifying the condition based at least in part on a number of successful transmissions to one or more sets of UEs on the list of UEs suitable for simultaneous transmission. For example, after n number of successful transmissions to sets of UEs on the list, the multi-TRP UE 120a may lower the minimum SIR and/or otherwise modify the condition such that new sets of UEs that satisfy the modified condition are added to the list. Similarly, the multi-TRP UE 120a may remove sets of UEs from the list by modifying the condition based at least in part on a number of unsuccessful transmissions to one or more sets of UEs on the list of UEs suitable for simultaneous transmission. For example, after m number of unsuccessful transmissions to sets of UEs on the list, the multi-TRP UE 120a may raise the minimum SIR and/or otherwise modify the condition such that one or more sets of UEs that do not satisfy the modified condition are removed from the list.

As shown in FIG. 7, and in connection with reference number 705, the multi-TRP UE 120a may transmit, on a first resource and using the first TRP 305a, a signal (e.g., a first message) to the second UE 120b. As further shown in FIG. 7, and in connection with reference number 710, the multi-TRP UE 120a may transmit, on a second resource overlapping at least in part with the first resource and using the second TRP 305b, a signal (e.g., a second message) to the third UE 120c. For example, the first resource and the second resource may overlap in time and/or frequency.

In some aspects, the multi-TRP UE 120a may transmit to the second UE 120b and the third UE 120c based at least in part on determining that the multi-TRP UE 120a is capable of simultaneously transmitting to the second UE 120b and the third UE 120c. For example, as described above, one or more measures of signal strength associated with the second UE 120b and/or the third UE 120c may satisfy a condition set by the multi-TRP UE 120a. By using the simultaneous transmission as shown in FIG. 7, the multi-TRP UE 120a reduces resource overhead by using at least partially overlapping resources to transmit to the second UE 120b and the third UE 120c. Additionally, the multi-TRP UE 120a reduces latency in communicating with the second UE 120b and the third UE 120c because communications to the second UE 120b can be at least partially simultaneous in time with communications to the third UE 120c.

As indicated above, FIG. 7 is provided as an example. Other examples may differ from what is described with respect to FIG. 7.

Figure 8:
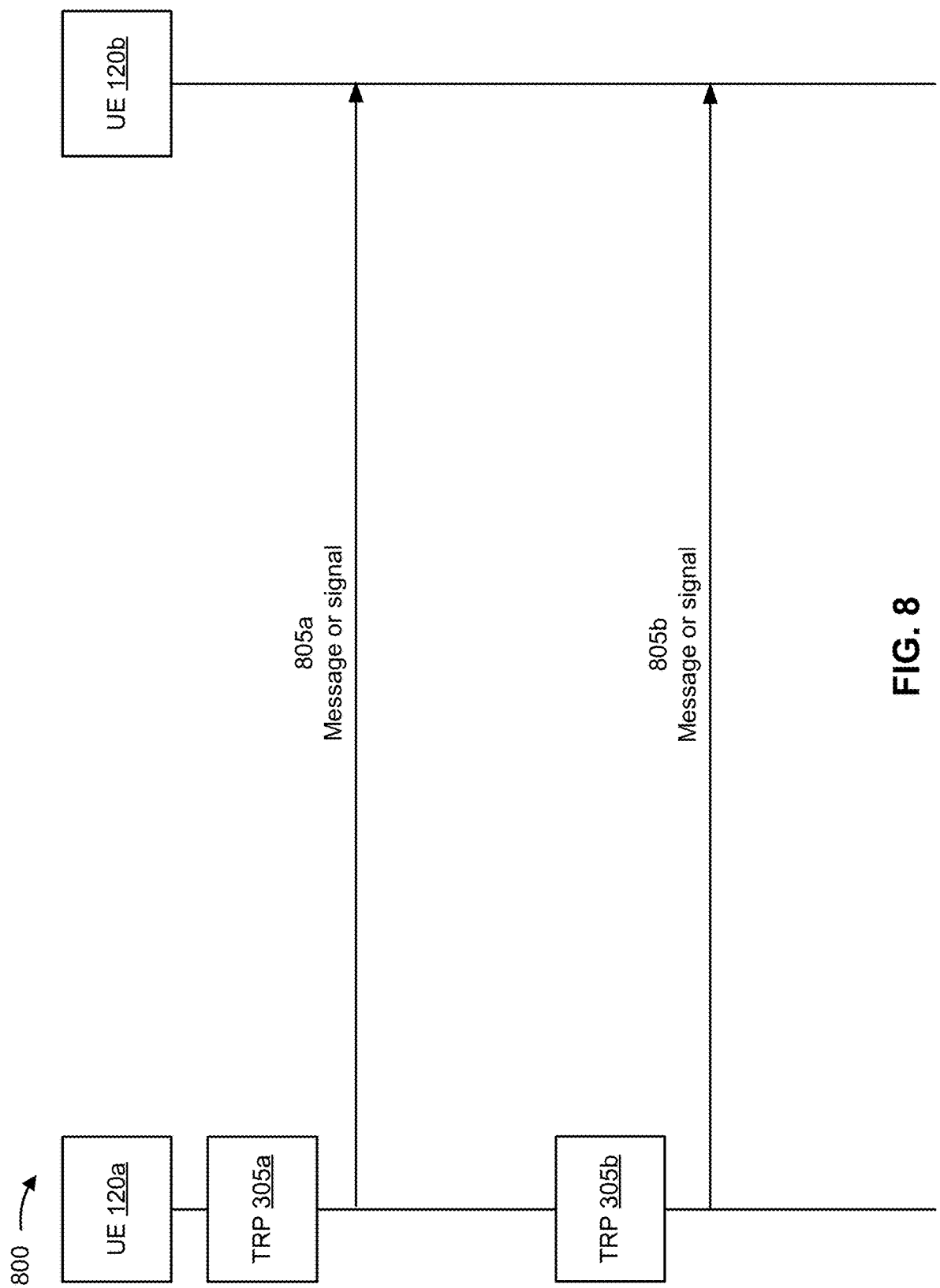
FIG. 8 is a diagram illustrating an example of combined transmission from a multi-TRP UE, in accordance with the present disclosure.

FIG. 8 is a diagram illustrating an example 800 of combined transmission from a multi-TRP UE 120a, in accordance with the present disclosure. As shown in FIG. 8, example 800 includes a UE 120a with a plurality of TRPs (e.g., first TRP 305a and second TRP 305b) in communication (e.g., on a sidelink channel, as described above in connection with FIGS. 4-5) with a second UE 120b. Although the description below will focus on the UE 120a with two TRPs 305a and 305b, the description similarly applies to a UE 120a with additional TRPs (e.g., three TRPs, four TRPs, and so on).

In example 800, the multi-TRP UE 120a may adjust at least one of a transmission power for the first TRP 305a, a transmission power for the second TRP 305b, or a combination thereof, based at least in part on at least one report of signal quality associated with the first TRP 305a and the second TRP 305b. For example, the multi-TRP UE 120a may adjust the transmission power for the first TRP 305a, the transmission power for the second TRP 305b, or a combination thereof, based on at least one report received as described above in connection with FIG. 6.

In some aspects, the multi-TRP UE 120a may be configured for a first MCS, and the adjusting may be based at least in part on configuring the multi-TRP UE 120a for a second MCS. For example, the second MCS may be a higher MCS than the first MCS. Accordingly, the multi-TRP UE 120a may use fewer network resources when transmitting using the second MCS as compared with transmitting using the first MCS.

Additionally, or alternatively, the adjusting may be based at least in part on at least one measurement, included in the at least one report, satisfying at least one condition. For example, the multi-TRP UE 120a may adjust the transmission power for the first TRP 305a, the transmission power for the second TRP 305b, or a combination thereof when a first measure of signal strength associated with the first TRP 305a and the second UE 120b and/or a second measure of signal strength associated with the second TRP 305b and the second UE 120b satisfies a threshold. For example, the multi-TRP UE 120a may determine whether a first RSRP associated with the first TRP 305a and the second UE 120b, a second RSRP associated with the second TRP 305b and the second UE 120b, a combination of the first RSRP and the second RSRP, and/or a minimum (or maximum) of the first RSRP and the second RSRP satisfies the threshold.

As shown by reference numbers 805a and 805b, the UE 120a may transmit a message or signal to the second UE 120b from both the first TRP 305a and the second TRP 305b. For example, the multi-TRP UE 120a may transmit using both the first TRP 305a and the second TRP 305b based at least in part on the at least one report (e.g., when a first RSRP associated with the first TRP 305a and the second UE 120b and/or a second RSRP associated with the second TRP 305b and the second UE 120b satisfy a threshold) and/or a determination made based at least in part on the at least one report (e.g., by determining that the multi-TRP UE 120*a* is capable of using a higher MCS with the UE 120*b* by adjusting the transmission power for the first TRP 305*a*, the transmission power for the second TRP 305*b*, or a combination thereof), as described above.

In some aspects, the second UE 120*b* may combine decoded data from the signal transmitted from both the first TRP and the second TRP. For example, the multi-TRP UE 120*a* may have transmitted SCI to the second UE 120*b* that includes an indication to combine decoded data from the signal transmitted from both the first TRP and the second TRP. In some aspects, the multi-TRP UE 120*a* may have transmitted a QCL indicator and/or the like to trigger the second UE 120*b* to combine the decoded data. In some aspects, the second UE 120*b* may combine the decoded data using log-likelihood ratio (LLR) and/or another decoding technique.

Additionally, or alternatively, and as described above, the second UE 120*b* may be (at least initially) configured for the first MCS, and the message or signal may be received using the second MCS. For example, the second MCS may be a higher MCS than the first MCS and enabled by combined transmission from the first TRP 305*a* and the second TRP 305*b*. Accordingly, the second MCS may require fewer network resources from the multi-TRP UE 120*a* during transmission than the first MCS.

In some aspects, the multi-TRP UE 120*a* may apply resource exclusion before using combined transmission as described above. For example, the multi-TRP UE 120*a* may determine a resource exclusion for the first TRP 305*a* and a resource exclusion for the second TRP 305*b* based at least in part on the adjusting. For example, after adjusting, the multi-TRP UE 120*a* may transmit CSI-RSs (and/or other reference signals) between TRPs (e.g., from the first TRP 305*a* to the second TRP 305*b* and/or from the second TRP 305*b* to the first TRP 305*a*) for measurement (e.g., as RSRP parameters and/or other parameters). Additionally, or alternatively, the multi-TRP UE 120*a* may perform the measurement using synchronization signal blocks (SSBs), DMRSs, and/or other reference signals. The multi-TRP UE 120*a* may transmit to the second UE 120*b* using both the first TRP 305*a* and the second TRP 305*b* based at least in part on the resource exclusion, where the resource exclusion is based at least in part on the measurement after adjusting.

In some aspects, determining the resource exclusion may be based at least in part on a first resource map associated with the first TRP 305*a* and a second resource map associated with the second TRP 305*b*. For example, the multi-TRP UE 120*a* may select one or more resources from the first resource map and one or more resources from the second resource map such that all selected resources satisfy one or more resource exclusion criteria applied by the multi-TRP UE 120*a*.

By using combined transmission as described above, the multi-TRP UE 120*a* may enable a higher MCS for transmission to the second UE 120*b* than otherwise enabled when using only one TRP. Accordingly, the multi-TRP UE 120*a* uses fewer network resources when transmitting on the higher MCS. Additionally, or alternatively, the multi-TRP UE 120*a* improves signal quality and/or reliability by using more than one TRP to transmit to the second UE 120*b*. This can also reduce latency because the multi-TRP UE 120*a* can transmit a message or signal using more than one TRP rather than repeatedly transmitting the message or signal as is often required when signal quality and/or reliability is low.

As indicated above, FIG. 8 is provided as an example. Other examples may differ from what is described with respect to FIG. 8.

Figure 9:
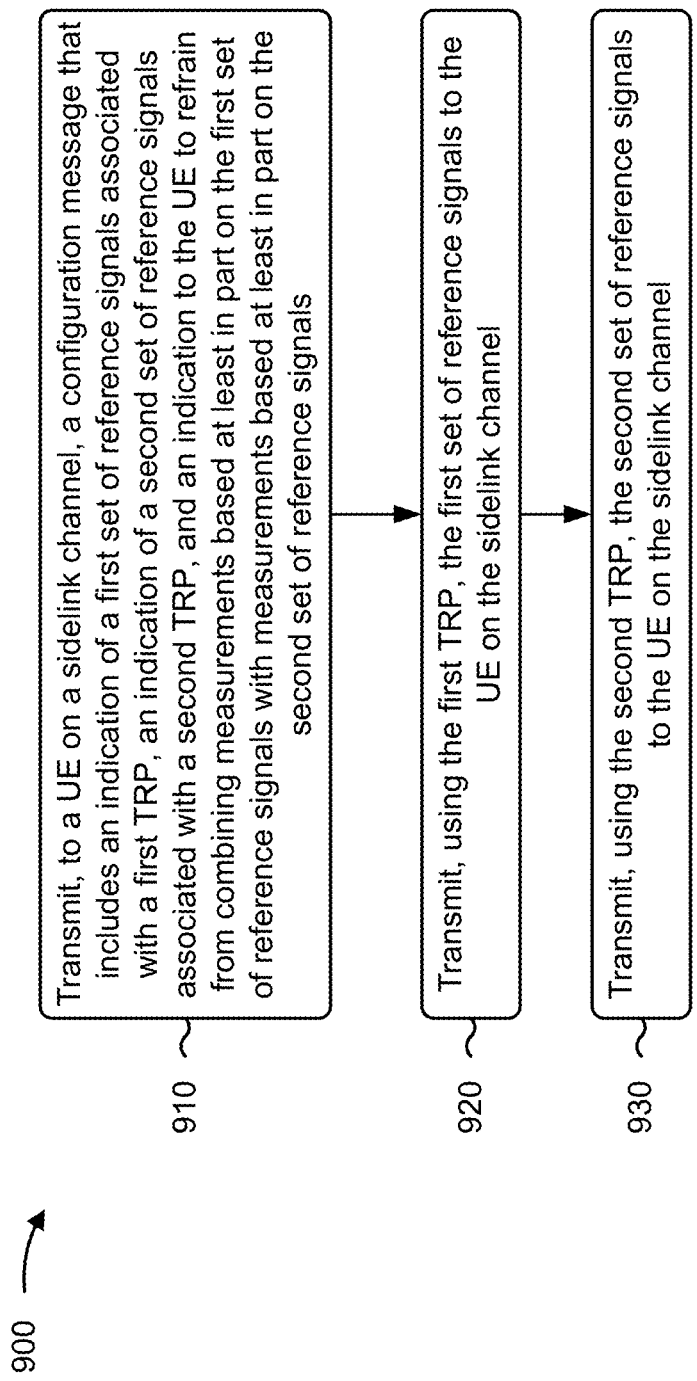
FIG. 9 is a diagram illustrating an example process performed by a UE, in accordance with the present disclosure.

FIG. 9 is a diagram illustrating an example process 900 performed, for example, by a first UE, in accordance with the present disclosure. Example process 900 is an example where the first UE (e.g., multi-TRP UE 120*a*) performs operations associated with channel measurements and concurrent messages for UEs with multiple TRPs.

As shown in FIG. 9, in some aspects, process 900 may include transmitting, to a second UE (e.g., UE 120*b*) on a sidelink channel, a configuration message (block 910). For example, the first UE (e.g., using one or more of antenna 252, transmit processor 264, TX MIMO processor 266, modulator 254, controller/processor 280, and/or memory 282) may transmit, to the second UE on the sidelink channel, the configuration message, as described above. In some aspects, the configuration message includes an indication of a first set of reference signals associated with a first TRP of the first UE, an indication of a second set of reference signals associated with a second TRP of the first UE, and an indication to the second UE to refrain from combining measurements based at least in part on the first set of reference signals with measurements based at least in part on the second set of reference signals.

As further shown in FIG. 9, in some aspects, process 900 may include transmitting, using the first TRP of the first UE, the first set of reference signals to the second UE on the sidelink channel (block 920). For example, the first UE (e.g., using one or more of antenna 252, transmit processor 264, TX MIMO processor 266, modulator 254, controller/processor 280, and/or memory 282) may transmit, using the first TRP of the first UE, the first set of reference signals to the second UE on the sidelink channel, as described above.

As further shown in FIG. 9, in some aspects, process 900 may include transmitting, using the second TRP of the first UE, the second set of reference signals to the second UE on the sidelink channel (block 930). For example, the first UE (e.g., using one or more of antenna 252, transmit processor 264, TX MIMO processor 266, modulator 254, controller/processor 280, and/or memory 282) may transmit, using the second TRP of the first UE, the second set of reference signals to the second UE on the sidelink channel, as described above.

Process 900 may include additional aspects, such as any single aspect or any combination of aspects described below and/or in connection with one or more other processes described elsewhere herein.

In a first aspect, the configuration message is an RRC message.

In a second aspect, alone or in combination with the first aspect, the indication of the first set of reference signals includes at least one first measurement gap offset for the first set of reference signals and at least one first measurement gap period for the first set of reference signals.

In a third aspect, alone or in combination with one or more of the first and second aspects, the indication of the second set of reference signals includes at least one second measurement gap offset for the second set of reference signals and at least one second measurement gap period for the second set of reference signals, the at least one first measurement gap offset is different from the at least one second measurement gap offset.

In a fourth aspect, alone or in combination with one or more of the first through third aspects, the at least one first measurement gap period includes a same period as the at least one second measurement gap period.

In a fifth aspect, alone or in combination with one or more of the first through fourth aspects, the indication of the first set of reference signals includes information identifying at least one first port for the first set of reference signals and at least one second port for the second set of reference signals.

In a sixth aspect, alone or in combination with one or more of the first through fifth aspects, the first set of reference signals and the second set of reference signals are multiplexed within one or more subframes or slots in a measurement period.

In a seventh aspect, alone or in combination with one or more of the first through sixth aspects, the first set of reference signals and the second set of reference signals are multiplexed using time division multiplexing, code division multiplexing, frequency division multiplexing, or a combination thereof.

In an eighth aspect, alone or in combination with one or more of the first through seventh aspects, process 900 further includes receiving (e.g., using one or more of antenna 252, demodulator 254, MIMO detector 256, receive processor 258, controller/processor 280, and/or memory 282), from the second UE and based at least in part on transmitting the first set of reference signals and transmitting the second set of reference signals, at least one report calculated by the second UE, where measurements based at least in part on the first set of reference signals and included in the at least one report are not combined with measurements based at least in part on the second set of reference signals and included in the at least one report.

In a ninth aspect, alone or in combination with one or more of the first through eighth aspects, the at least one report includes a first report based at least in part on measuring the first set of reference signals and a second report based at least in part on measuring the second set of reference signals.

In a tenth aspect, alone or in combination with one or more of the first through ninth aspects, the at least one report includes a report with an index relating a first portion of the report to the first set of reference signals and a second portion of the report to the second set of reference signals.

In an eleventh aspect, alone or in combination with one or more of the first through tenth aspects, the at least one report includes at least one of a first SINR, a first RSRP, or a combination thereof for the first set of reference signals, and at least one of a second SINR, a second RSRP, or a combination thereof for the second set of reference signals.

In a twelfth aspect, alone or in combination with one or more of the first through eleventh aspects, process 900 further includes determining (e.g., using one or more of MIMO detector 256, receive processor 258, transmit processor 264, TX MIMO processor 266, controller/processor 280, and/or memory 282), based at least in part on the at least one report, that the first UE is capable of simultaneously transmitting to the second UE and a third UE; transmitting (e.g., using one or more of antenna 252, transmit processor 264, TX MIMO processor 266, modulator 254, controller/processor 280, and/or memory 282), on a first resource and using the first TRP, a signal to the second UE; and transmitting (e.g., using one or more of antenna 252, transmit processor 264, TX MIMO processor 266, modulator 254, controller/processor 280, and/or memory 282), on a second resource overlapping at least in part with the first resource and using the second TRP, a signal to the third UE, based at least in part on determining that the first UE is capable of simultaneously transmitting to the second UE and the third UE.

In a thirteenth aspect, alone or in combination with one or more of the first through twelfth aspects, determining that the first UE is capable of simultaneously transmitting to the second UE and the third UE includes determining that at least one of a first SIR associated with the second UE, a second SIR associated with the third UE, or a combination thereof satisfies a condition.

In a fourteenth aspect, alone or in combination with one or more of the first through thirteenth aspects, determining that the first UE is capable of simultaneously transmitting to the second UE and the third UE further includes adding the second UE and the third UE as a set to a list of UEs suitable for simultaneous transmission.

In a fifteenth aspect, alone or in combination with one or more of the first through fourteenth aspects, process 900 further includes modifying (e.g., using one or more of MIMO detector 256, receive processor 258, transmit processor 264, TX MIMO processor 266, controller/processor 280, and/or memory 282) the condition based at least in part on a number of successful transmissions to one or more sets of UEs on the list of UEs suitable for simultaneous transmission.

In a sixteenth aspect, alone or in combination with one or more of the first through fifteenth aspects, process 900 further includes modifying (e.g., using one or more of MIMO detector 256, receive processor 258, transmit processor 264, TX MIMO processor 266, controller/processor 280, and/or memory 282) the condition based at least in part on a number of unsuccessful transmissions to one or more sets of UEs on the list of UEs suitable for simultaneous transmission.

In a seventeenth aspect, alone or in combination with one or more of the first through sixteenth aspects, process 900 further includes adjusting (e.g., using one or more of antenna 252, transmit processor 264, TX MIMO processor 266, modulator 254, controller/processor 280, and/or memory 282) at least one of a transmission power for the first TRP, a transmission power for the second TRP, or a combination thereof, based at least in part on the at least one report; and transmitting (e.g., using one or more of antenna 252, transmit processor 264, TX MIMO processor 266, modulator 254, controller/processor 280, and/or memory 282), based at least in part on the adjusting, a signal to the second UE using both the first TRP and the second TRP.

In an eighteenth aspect, alone or in combination with one or more of the first through seventeenth aspects, the first UE is configured for a first MCS, and the adjusting is based at least in part on configuring the first UE for a second MCS.

In a nineteenth aspect, alone or in combination with one or more of the first through eighteenth aspects, the adjusting is based at least in part on at least one measurement, included in the at least one report, satisfying at least one condition.

In a twentieth aspect, alone or in combination with one or more of the first through nineteenth aspects, process 900 further includes transmitting (e.g., using one or more of antenna 252, transmit processor 264, TX MIMO processor 266, modulator 254, controller/processor 280, and/or memory 282), to the second UE, SCI that includes an indication to the second UE to combine decoded data from the signal transmitted to the second UE using both the first TRP and the second TRP.

In a twenty-first aspect, alone or in combination with one or more of the first through twentieth aspects, process 900 further includes determining (e.g., using one or more of MIMO detector 256, receive processor 258, transmit processor 264, TX MIMO processor 266, controller/processor 280, and/or memory 282) a resource exclusion for the first TRP and a resource exclusion for the second TRP based at least in part on the adjusting.

In a twenty-second aspect, alone or in combination with one or more of the first through twenty-first aspects, determining the resource exclusion is based at least in part on a first resource map associated with the first TRP and a second resource map associated with the second TRP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
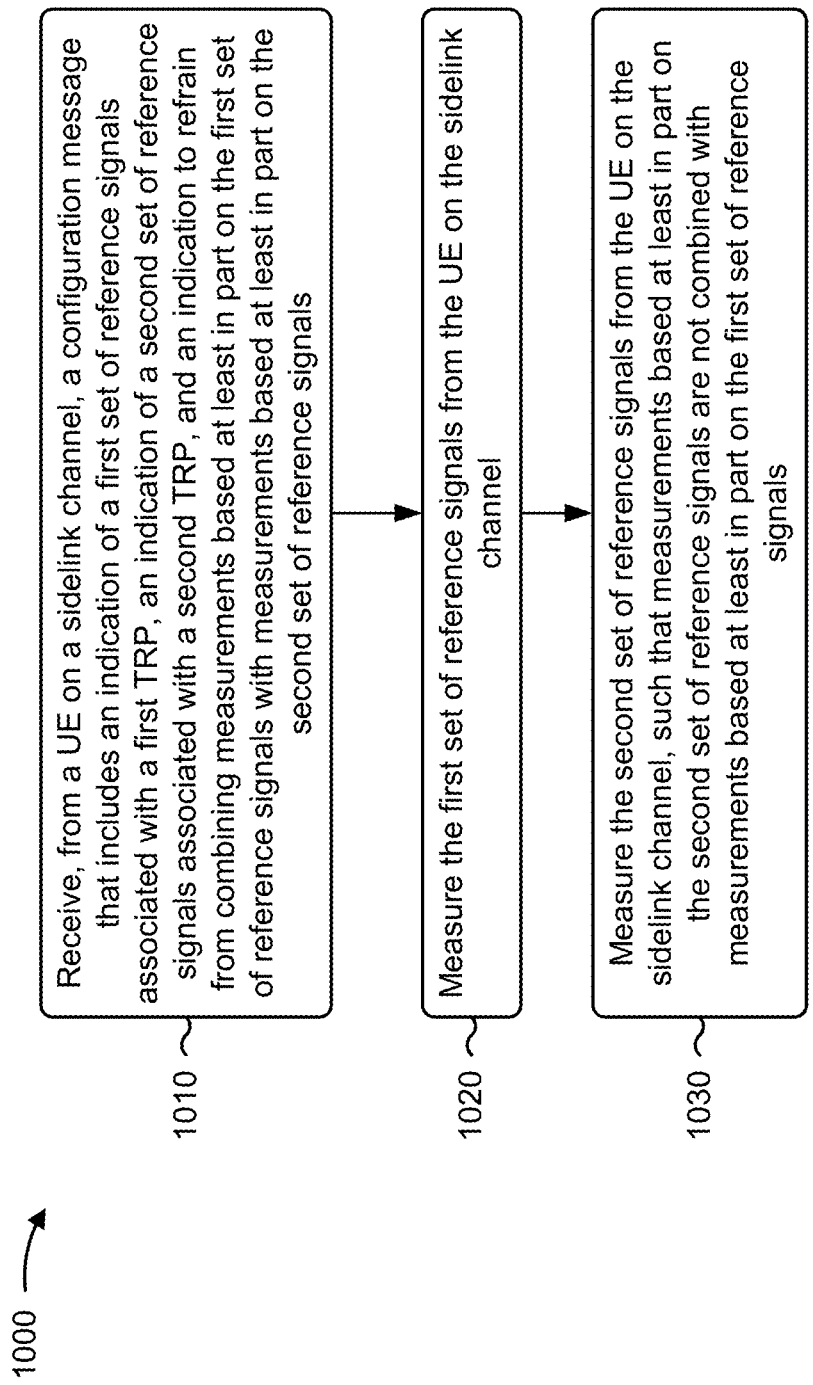
FIG. 10 is a diagram illustrating another example process performed by a UE, in accordance with the present disclosure.

FIG. 10 is a diagram illustrating an example process 1000 performed, for example, by a first UE, in accordance with various aspects of the present disclosure. Example process 1000 is an example where the first UE (e.g., UE 120b) performs operations associated with channel measurements and concurrent messages for UEs with multiple TRPs.

As shown in FIG. 10, in some aspects, process 1000 may include receiving, from a second UE (e.g., multi-TRP UE 120a) on a sidelink channel, a configuration message (block 1010). For example, the first UE (e.g., using one or more of antenna 252, demodulator 254, MIMO detector 256, receive processor 258, controller/processor 280, and/or memory 282) may receive, from the second UE on the sidelink channel, the configuration message, as described above. In some aspects, the configuration message includes an indication of a first set of reference signals associated with a TRP of the second UE, an indication of a second set of reference signals associated with a second TRP of the second UE, and an indication to refrain from combining measurements based at least in part on the first set of reference signals with measurements based at least in part on the second set of reference signals.

As further shown in FIG. 10, in some aspects, process 1000 may include measuring the first set of reference signals from the second UE on the sidelink channel (block 1020). For example, the first UE (e.g., using one or more of antenna 252, demodulator 254, MIMO detector 256, receive processor 258, controller/processor 280, and/or memory 282) may measure the first set of reference signals from the second UE on the sidelink channel, as described above.

As further shown in FIG. 10, in some aspects, process 1000 may include measuring the second set of reference signals from the second UE on the sidelink channel (block 1030). For example, the first UE (e.g., using one or more of antenna 252, demodulator 254, MIMO detector 256, receive processor 258, controller/processor 280, and/or memory 282) may measure the second set of reference signals from the second UE on the sidelink channel, as described above. In some aspects, measurements based at least in part on the second set of reference signals are not combined with measurements based at least in part on the first set of reference signals.

Process 1000 may include additional aspects, such as any single aspect or any combination of aspects described below and/or in connection with one or more other processes described elsewhere herein.

In a first aspect, the configuration message is an RRC message.

In a second aspect, alone or in combination with the first aspect, the indication of the first set of reference signals includes at least one first measurement gap offset for the first set of reference signals and at least one first measurement gap period for the first set of reference signals.

In a third aspect, alone or in combination with one or more of the first and second aspects, the indication of the second set of reference signals includes at least one second measurement gap offset for the second set of reference signals and at least one second measurement gap period for the second set of reference signals, the at least one first measurement gap offset is different from the at least one second measurement gap offset.

In a fourth aspect, alone or in combination with one or more of the first through third aspects, the at least one first measurement gap period includes a same period as the at least one second measurement gap period.

In a fifth aspect, alone or in combination with one or more of the first through fourth aspects, the indication of the first set of reference signals includes information identifying at least one first port for the first set of reference signals and at least one second port for the second set of reference signals.

In a sixth aspect, alone or in combination with one or more of the first through fifth aspects, the first set of reference signals and the second set of reference signals are multiplexed within one or more subframes or slots in a measurement period.

In a seventh aspect, alone or in combination with one or more of the first through sixth aspects, the first set of reference signals and the second set of reference signals are multiplexed using time division multiplexing, code division multiplexing, frequency division multiplexing, or a combination thereof.

In an eighth aspect, alone or in combination with one or more of the first through seventh aspects, process 1000 further includes transmitting (e.g., using one or more of antenna 252, transmit processor 264, TX MIMO processor 266, modulator 254, controller/processor 280, and/or memory 282), to the second UE and based at least in part on measuring the first set of reference signals and measuring the second set of reference signals, at least one report calculated by the first UE, where results of measuring the first set of reference signals are not combined with results of measuring the second set of reference signals.

In a ninth aspect, alone or in combination with one or more of the first through eighth aspects, the at least one report includes a first report based at least in part on measuring the first set of reference signals and a second report based at least in part on measuring the second set of reference signals.

In a tenth aspect, alone or in combination with one or more of the first through ninth aspects, the at least one report includes a report with an index relating a first portion of the report to the first set of reference signals and a second portion of the report to the second set of reference signals.

In an eleventh aspect, alone or in combination with one or more of the first through tenth aspects, the at least one report includes at least one of a first SINR, a first RSRP, or a combination thereof for the first set of reference signals, and at least one of a second SINR, a second RSRP, or a combination thereof for the second set of reference signals.

In a twelfth aspect, alone or in combination with one or more of the first through eleventh aspects, process 1000 further includes receiving (e.g., using one or more of antenna 252, demodulator 254, MIMO detector 256, receive processor 258, controller/processor 280, and/or memory 282) a signal, from the second UE, transmitted from both the first TRP and the second TRP.

In a thirteenth aspect, alone or in combination with one or more of the first through twelfth aspects, the second UE is configured for a first MCS, and the signal is received using a second MCS.

In a fourteenth aspect, alone or in combination with one or more of the first through thirteenth aspects, process 1000 further includes receiving (e.g., using one or more of antenna 252, demodulator 254, MIMO detector 256, receive processor 258, controller/processor 280, and/or memory 282), from the second UE, SCI that includes an indication to combine decoded data from the signal transmitted from both the first TRP and the second TRP.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
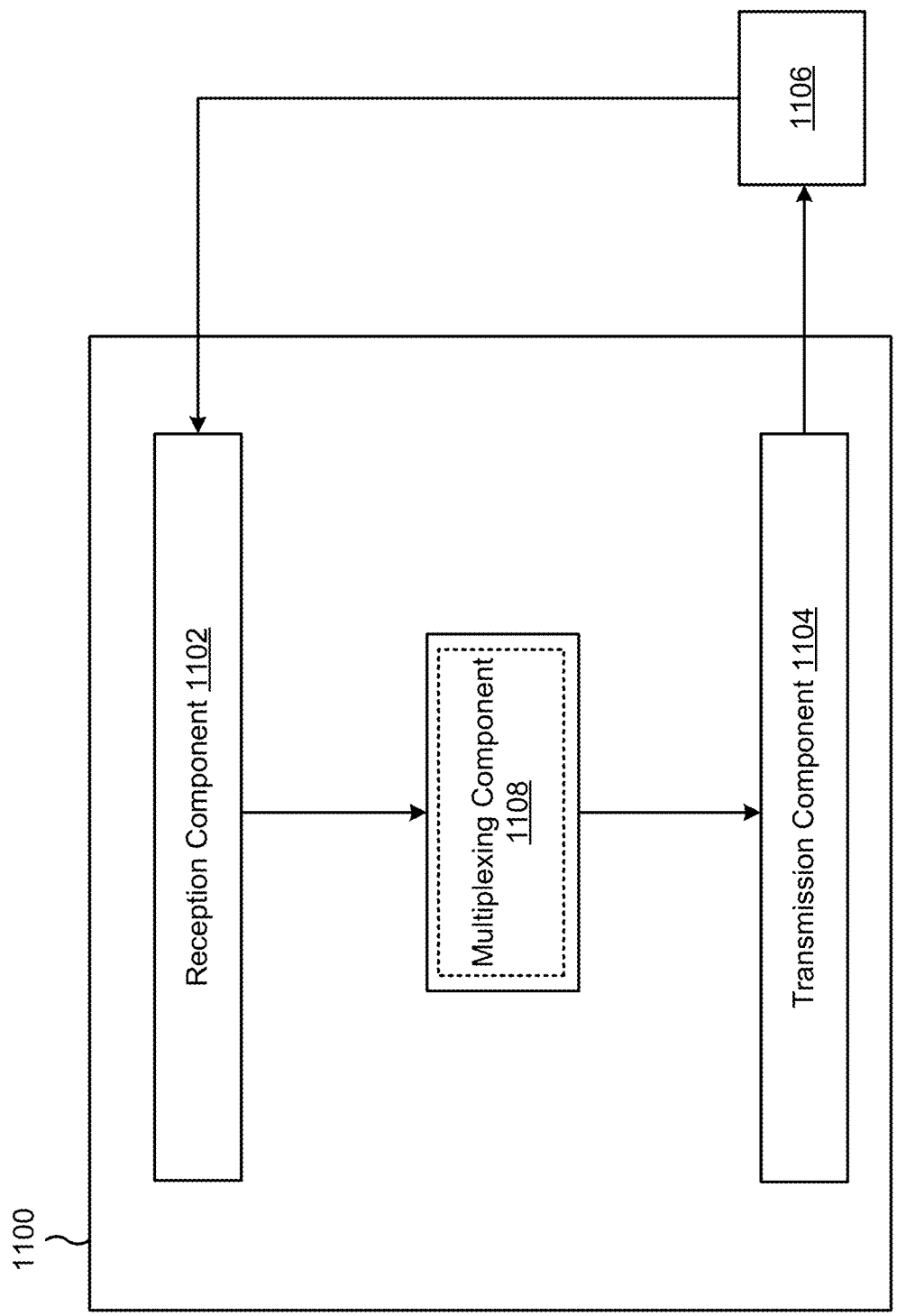
FIG. 11 is a block diagram of an example apparatus for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a multiplexing component 1108, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the transmission component 1104 may transmit, to the apparatus 1106 on a sidelink channel, a configuration message. For example, the configuration message may include an indication of a first set of reference signals associated with a first TRP of the apparatus 1100, an indication of a second set of reference signals associated with a second TRP of the apparatus 1100, and an indication to the apparatus 1106 to refrain from combining measurements based at least in part on the first set of reference signals with measurements based at least in part on the second set of reference signals. Accordingly, the multiplexing component 1108 may determine orthogonal multiplexing schemes for the first set of reference signals and the second set of reference signals that transmission component 1104 may use to transmit the first set of reference signals and the second set of reference signals. In some aspects, the multiplexing component 1108 may include one or more antennas, a modulator, a transmit MIMO processor, a transmit processor, a controller/processor, a memory, or a combination thereof, of the UE described above in connection with FIG. 2. The transmission component 1104 may transmit, using the first TRP of the apparatus 1100, the first set of reference signals to the apparatus 1106 on the sidelink channel, and transmit, using the second TRP of the apparatus 1100, the second set of reference signals to the apparatus 1106 on the sidelink channel. In some aspects, the reception component 1102 may receive, from the apparatus 1106 and based at least in part on transmitting the first set of reference signals and transmitting the second set of reference signals, at least one report calculated by the apparatus 1106. Accordingly, the multiplexing component 1108 may configure the first TRP and the second TRP for simultaneous transmission (e.g., as described above in connection with FIG. 7 and/or FIG. 8).

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
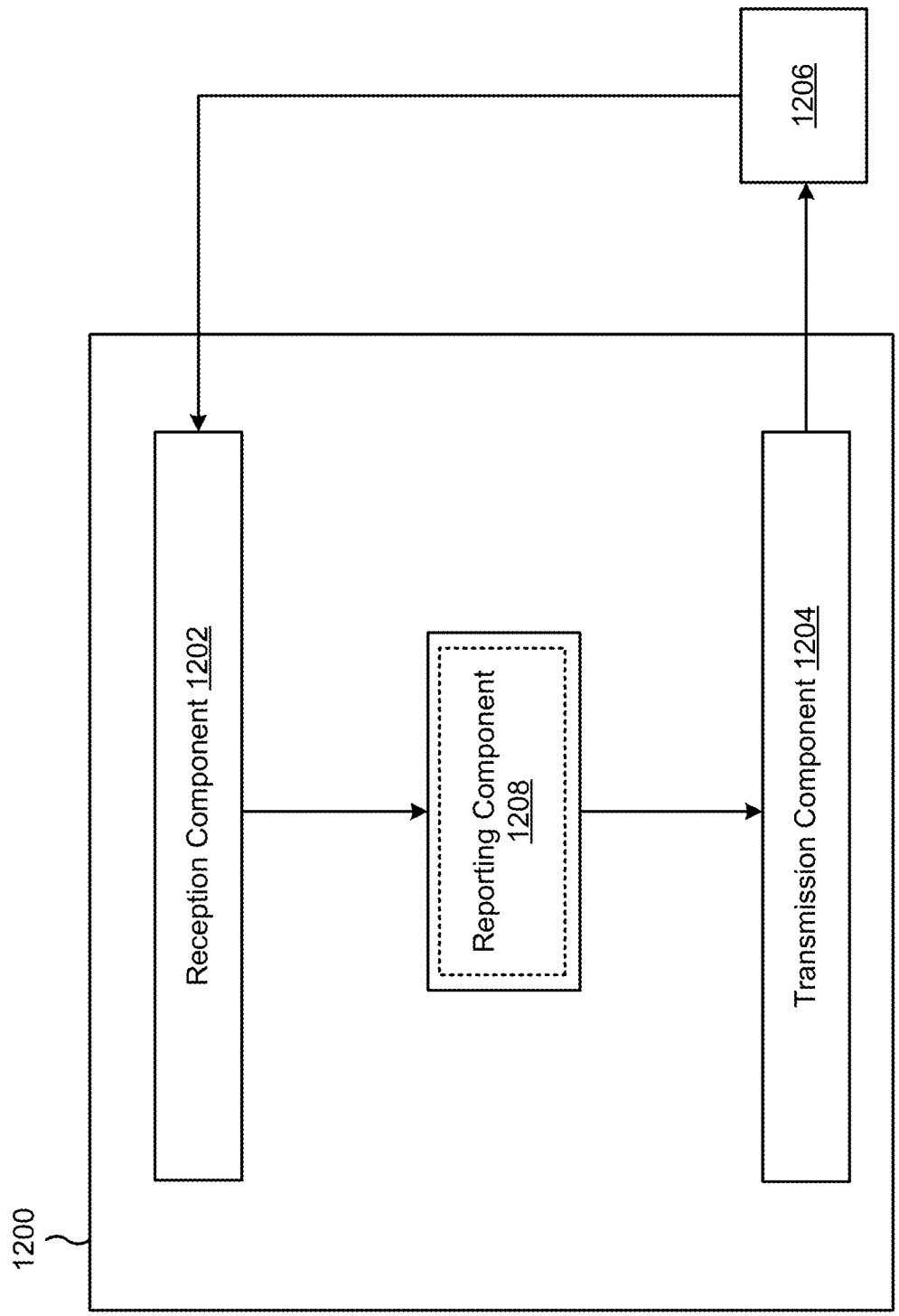
FIG. 12 is a block diagram of another example apparatus for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a reporting component 1208, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the reception component 1202 may receive, from apparatus 1206 on a sidelink channel, a configuration message. For example, the configuration message may include an indication of a first set of reference signals associated with a first TRP of the apparatus 1206, an indication of a second set of reference signals associated with a second TRP of the apparatus 1206, and an indication to refrain from combining measurements based at least in part on the first set of reference signals with measurements based at least in part on the second set of reference signals. Accordingly, the reception component 1202 may measure the first set of reference signals from the apparatus 1206 on the sidelink channel, and measure the second set of reference signals from the apparatus 1206 on the sidelink channel. Based at least in part on the configuration message, the apparatus 1200 does not combine measurements based at least in part on the second set of reference signals with measurements based at least in part on the first set of reference signals. The reporting component 1208 may generate at least one report based at least in part on measuring the first set of reference signals and measuring the second set of reference signals. In some aspects, the reporting component 1208 may include a MIMO detector, a receive processor, a transmit MIMO processor, a transmit processor, a controller/processor, a memory, or a combination thereof, of the UE described above in connection with FIG. 2. The transmission component 1204 may transmit, to the apparatus 1206, the at least one report.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: transmitting, to a second UE on a sidelink channel, a configuration message, wherein the configuration message includes: an indication of a first set of reference signals associated with a first transmit-receive point (TRP) of the first UE, an indication of a second set of reference signals associated with a second TRP of the first UE, and an indication to the second UE to refrain from combining measurements based at least in part on the first set of reference signals with measurements based at least in part on the second set of reference signals; transmitting, using the first TRP of the first UE, the first set of reference signals to the second UE on the sidelink channel; and transmitting, using the second TRP of the first UE, the second set of reference signals to the second UE on the sidelink channel.

Aspect 2: The method of Aspect 1, wherein the configuration message is a radio resource control (RRC) message.

Aspect 3: The method of any of Aspects 1 through 2, wherein the indication of the first set of reference signals includes at least one first measurement gap offset for the first set of reference signals and at least one first measurement gap period for the first set of reference signals.

Aspect 4: The method of Aspect 3, wherein the indication of the second set of reference signals includes at least one second measurement gap offset for the second set of reference signals and at least one second measurement gap period for the second set of reference signals.

Aspect 5: The method of Aspect 4, wherein the at least one first measurement gap offset is different from the at least one second measurement gap offset.

Aspect 6: The method of any of Aspects 4 through 5, wherein the at least one first measurement gap period includes a same period as the at least one second measurement gap period.

Aspect 7: The method of any of Aspects 1 through 6, wherein the indication of the first set of reference signals includes information identifying at least one first port for the first set of reference signals and at least one second port for the second set of reference signals.

Aspect 8: The method of any of Aspects 1 through 7, wherein the first set of reference signals and the second set of reference signals are multiplexed within one or more subframes or slots in a measurement period.

Aspect 9: The method of Aspect 8, wherein the first set of reference signals and the second set of reference signals are multiplexed using time division multiplexing, code division multiplexing, frequency division multiplexing, or a combination thereof.

Aspect 10: The method of any of Aspects 1 through 9, further comprising: receiving, from the second UE and based at least in part on transmitting the first set of reference signals and transmitting the second set of reference signals, at least one report calculated by the second UE, wherein measurements based at least in part on the first set of reference signals and included in the at least one report are not combined with measurements based at least in part on the second set of reference signals and included in the at least one report.

Aspect 11: The method of Aspect 10, wherein the at least one report includes a first report based at least in part on measuring the first set of reference signals and a second report based at least in part on measuring the second set of reference signals.

Aspect 12: The method of Aspect 10, wherein the at least one report includes a report with an index relating a first portion of the report to the first set of reference signals and a second portion of the report to the second set of reference signals.

Aspect 13: The method of any of Aspects 10 through 12, wherein the at least one report includes at least one of a first signal-to-interference-plus-noise ratio (SINR), a first reference signal received power (RSRP), or a combination thereof for the first set of reference signals, and at least one of a second SINR, a second RSRP, or a combination thereof for the second set of reference signals.

Aspect 14: The method of any of Aspects 10 through 13, further comprising: determining, based at least in part on the at least one report, that the first UE is capable of simultaneously transmitting to the second UE and a third UE; transmitting, on a first resource and using the first TRP, a signal to the second UE; and transmitting, on a second resource overlapping at least in part with the first resource and using the second TRP, a signal to the third UE, based at least in part on determining that the first UE is capable of simultaneously transmitting to the second UE and the third UE.

Aspect 15: The method of Aspect 14, wherein determining that the first UE is capable of simultaneously transmitting to the second UE and the third UE comprises determining that at least one of a first signal-to-interference ratio (SIR) associated with the second UE, a second SIR associated with the third UE, or a combination thereof satisfies a condition.

Aspect 16: The method of Aspect 15, wherein determining that the first UE is capable of simultaneously transmitting to the second UE and the third UE further comprises adding the second UE and the third UE as a set to a list of UEs suitable for simultaneous transmission.

Aspect 17: The method of Aspect 16, further comprising: modifying the condition based at least in part on a number of successful transmissions to one or more sets of UEs on the list of UEs suitable for simultaneous transmission.

Aspect 18: The method of Aspect 16, further comprising: modifying the condition based at least in part on a number of unsuccessful transmissions to one or more sets of UEs on the list of UEs suitable for simultaneous transmission.

Aspect 19: The method of any of Aspects 10 through 18, further comprising: adjusting at least one of a transmission power for the first TRP, a transmission power for the second TRP, or a combination thereof, based at least in part on the at least one report; and transmitting, based at least in part on the adjusting, a signal to the second UE using both the first TRP and the second TRP.

Aspect 20: The method of Aspect 19, wherein the first UE is configured for a first modulation and coding scheme (MCS), and the adjusting is based at least in part on configuring the first UE for a second MCS.

Aspect 21: The method of any of Aspects 19 through 20, wherein the adjusting is based at least in part on at least one measurement, included in the at least one report, satisfying at least one condition.

Aspect 22: The method of any of Aspects 19 through 21, further comprising: transmitting, to the second UE, sidelink control information (SCI), wherein the SCI includes an indication to the second UE to combine decoded data from the signal transmitted to the second UE using both the first TRP and the second TRP.

Aspect 23: The method of any of Aspects 19 through 22, further comprising: determining a resource exclusion for the first TRP and a resource exclusion for the second TRP based at least in part on the adjusting.

Aspect 24: The method of Aspect 23, wherein determining the resource exclusion is based at least in part on a first resource map associated with the first TRP and a second resource map associated with the second TRP.

Aspect 25: A method of wireless communication performed by a first user equipment (UE), comprising: receiving, from a second UE on a sidelink channel, a configuration message, wherein the configuration message includes: an indication of a first set of reference signals associated with a first transmit-receive point (TRP) of the second UE, an indication of a second set of reference signals associated with a second TRP of the second UE, and an indication to refrain from combining measurements based at least in part on the first set of reference signals with measurements based at least in part on the second set of reference signals; measuring the first set of reference signals from the second UE on the sidelink channel; and measuring the second set of reference signals from the second UE on the sidelink channel, wherein measurements based at least in part on the second set of reference signals are not combined with measurements based at least in part on the first set of reference signals.

Aspect 26: The method of Aspect 25, wherein the configuration message is a radio resource control (RRC) message.

Aspect 27: The method of any of Aspects 25 through 26, wherein the indication of the first set of reference signals includes at least one first measurement gap offset for the first set of reference signals and at least one first measurement gap period for the first set of reference signals.

Aspect 28: The method of Aspect 27, wherein the indication of the second set of reference signals includes at least one second measurement gap offset for the second set of reference signals and at least one second measurement gap period for the second set of reference signals.

Aspect 29: The method of Aspect 28, wherein the at least one first measurement gap offset is different from the at least one second measurement gap offset.

Aspect 30: The method of any of Aspects 28 through 29, wherein the at least one first measurement gap period includes a same period as the at least one second measurement gap period.

Aspect 31: The method of any of Aspects 25 through 30, wherein the indication of the first set of reference signals includes information identifying at least one first port for the first set of reference signals and at least one second port for the second set of reference signals.

Aspect 32: The method of any of Aspects 25 through 31, wherein the first set of reference signals and the second set of reference signals are multiplexed within one or more subframes or slots in a measurement period.

Aspect 33: The method of Aspect 32, wherein the first set of reference signals and the second set of reference signals are multiplexed using time division multiplexing, code division multiplexing, frequency division multiplexing, or a combination thereof.

Aspect 34: The method of any of Aspects 25 through 33, further comprising: transmitting, to the second UE and based at least in part on measuring the first set of reference signals and measuring the second set of reference signals, at least one report calculated by the first UE, wherein results of measuring the first set of reference signals are not combined with results of measuring the second set of reference signals.

Aspect 35: The method of Aspect 34, wherein the at least one report includes a first report based at least in part on measuring the first set of reference signals and a second report based at least in part on measuring the second set of reference signals.

Aspect 36: The method of Aspect 34, wherein the at least one report includes a report with an index relating a first portion of the report to the first set of reference signals and a second portion of the report to the second set of reference signals.

Aspect 37: The method of any of Aspects 34 through 36, wherein the at least one report includes at least one of a first signal-to-interference-plus-noise ratio (SINR), a first reference signal received power (RSRP), or a combination thereof for the first set of reference signals, and at least one of a second SINR, a second RSRP, or a combination thereof for the second set of reference signals.

Aspect 38: The method of any of Aspects 25 through 37, further comprising: receiving a signal, from the second UE, transmitted from both the first TRP and the second TRP.

Aspect 39: The method of Aspect 38, wherein the first UE is configured for a first modulation and coding scheme (MCS), and the signal is received using a second MCS.

Aspect 40: The method of any of Aspects 38 through 39, further comprising: receiving, from the second UE, sidelink control information (SCI), wherein the SCI includes an indication to combine decoded data from the signal transmitted from both the first TRP and the second TRP.

Aspect 41: An apparatus for wireless communication at a device, comprising a processor; memory coupled with the processor; and instructions stored in the memory and executable by the processor to cause the apparatus to perform the method of one or more Aspects of Aspects 1-24.

Aspect 42: A device for wireless communication, comprising a memory and one or more processors coupled to the memory, the memory and the one or more processors configured to perform the method of one or more Aspects of Aspects 1-24.

Aspect 43: An apparatus for wireless communication, comprising at least one means for performing the method of one or more Aspects of Aspects 1-24.

Aspect 44: A non-transitory computer-readable medium storing code for wireless communication, the code comprising instructions executable by a processor to perform the method of one or more Aspects of Aspects 1-24.

Aspect 45: A non-transitory computer-readable medium storing a set of instructions for wireless communication, the set of instructions comprising one or more instructions that, when executed by one or more processors of a device, cause the device to perform the method of one or more Aspects of Aspects 1-24.

Aspect 46: An apparatus for wireless communication at a device, comprising a processor; memory coupled with the processor; and instructions stored in the memory and executable by the processor to cause the apparatus to perform the method of one or more Aspects of Aspects 25-40.

Aspect 47: A device for wireless communication, comprising a memory and one or more processors coupled to the memory, the memory and the one or more processors configured to perform the method of one or more Aspects of Aspects 25-40.

Aspect 48: An apparatus for wireless communication, comprising at least one means for performing the method of one or more Aspects of Aspects 25-40.

Aspect 49: A non-transitory computer-readable medium storing code for wireless communication, the code comprising instructions executable by a processor to perform the method of one or more Aspects of Aspects 25-40.

Aspect 50: A non-transitory computer-readable medium storing a set of instructions for wireless communication, the set of instructions comprising one or more instructions that, when executed by one or more processors of a device, cause the device to perform the method of one or more Aspects of Aspects 25-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors coupled to the memory, the memory and the one or more processors configured to:
transmit, to a second UE on a sidelink channel, a configuration message, wherein the configuration message includes: an indication of a first set of reference signals associated with a first transmit-receive point (TRP) of the first UE, an indication of a second set of reference signals associated with a second TRP of the first UE, and an indication to the second UE to refrain from combining measurements based at least in part on the first set of reference signals with measurements based at least in part on the second set of reference signals;
transmit, using the first TRP of the first UE, the first set of reference signals to the second UE on the sidelink channel; and
transmit, using the second TRP of the first UE, the second set of reference signals to the second UE on the sidelink channel.

2. The UE of claim 1, wherein the indication of the first set of reference signals includes at least one first measurement gap offset for the first set of reference signals and at least one first measurement gap period for the first set of reference signals.

3. The UE of claim 2, wherein the indication of the second set of reference signals includes at least one second measurement gap offset for the second set of reference signals and at least one second measurement gap period for the second set of reference signals, wherein the at least one first measurement gap offset is different from the at least one second measurement gap offset.

4. The UE of claim 2, wherein the at least one first measurement gap period includes a same period as the at least one second measurement gap period.

5. The UE of claim 1, wherein the indication of the first set of reference signals includes information identifying at least one first port for the first set of reference signals and at least one second port for the second set of reference signals.

6. The UE of claim 1, wherein the first set of reference signals and the second set of reference signals are multiplexed within one or more subframes or slots in a measurement period.

7. The UE of claim 6, wherein the first set of reference signals and the second set of reference signals are multiplexed using time division multiplexing, code division multiplexing, frequency division multiplexing, or a combination thereof.

8. The UE of claim 1, wherein the memory and the one or more processors are further configured to:
receive, from the second UE and based at least in part on transmitting the first set of reference signals and transmitting the second set of reference signals, at least one report calculated by the second UE, wherein measurements based at least in part on the first set of reference signals and included in the at least one report are not combined with measurements based at least in part on the second set of reference signals and included in the at least one report.

9. The UE of claim 8, wherein the at least one report includes a first report based at least in part on measuring the first set of reference signals and a second report based at least in part on measuring the second set of reference signals.

10. The UE of claim 8, wherein the at least one report includes a report with an index relating a first portion of the report to the first set of reference signals and a second portion of the report to the second set of reference signals.

11. The UE of claim 8, wherein the memory and the one or more processors are further configured to:
determine, based at least in part on the at least one report, that the first UE is capable of simultaneously transmitting to the second UE and a third UE;
transmit, on a first resource and using the first TRP, a signal to the second UE; and
transmit, on a second resource overlapping at least in part with the first resource and using the second TRP, a signal to the third UE, based at least in part on determining that the first UE is capable of simultaneously transmitting to the second UE and the third UE.

12. The UE of claim 11, wherein determining that the first UE is capable of simultaneously transmitting to the second UE and the third UE comprises determining that at least one of a first signal-to-interference ratio (SIR) associated with the second UE, a second SIR associated with the third UE, or a combination thereof satisfies a condition.

13. The UE of claim 12, wherein determining that the first UE is capable of simultaneously transmitting to the second UE and the third UE comprises adding the second UE and the third UE as a set to a list of UEs suitable for simultaneous transmission.

14. The UE of claim 13, wherein the memory and the one or more processors are further configured to:
modify the condition based at least in part on a number of successful transmissions to one or more sets of UEs on the list of UEs suitable for simultaneous transmission.

15. The UE of claim 13, wherein the memory and the one or more processors are further configured to:
modify the condition based at least in part on a number of unsuccessful transmissions to one or more sets of UEs on the list of UEs suitable for simultaneous transmission.

16. The UE of claim 8, wherein the memory and the one or more processors are further configured to:
adjust at least one of a transmission power for the first TRP, a transmission power for the second TRP, or a combination thereof, based at least in part on the at least one report; and
transmit, based at least in part on the adjusting, a signal to the second UE using both the first TRP and the second TRP.

17. The UE of claim 16, wherein the first UE is configured for a first modulation and coding scheme (MCS), and the adjusting is based at least in part on configuring the first UE for a second MCS.

18. The UE of claim 16, wherein the adjusting is based at least in part on at least one measurement, included in the at least one report, satisfying at least one condition.

19. The UE of claim 16, wherein the memory and the one or more processors are further configured to:
transmit, to the second UE, sidelink control information (SCI), wherein the SCI includes an indication to the second UE to combine decoded data from the signal transmitted to the second UE using both the first TRP and the second TRP.

20. The UE of claim 16, wherein the memory and the one or more processors are further configured to:
determine a resource exclusion for the first TRP and a resource exclusion for the second TRP based at least in part on the adjusting.

21. The UE of claim 20, wherein determining the resource exclusion is based at least in part on a first resource map associated with the first TRP and a second resource map associated with the second TRP.

22. A first user equipment (UE) for wireless communication, comprising:
a memory; and
one or more processors coupled to the memory, the memory and the one or more processors configured to:
receive, from a second UE on a sidelink channel, a configuration message, wherein the configuration message includes: an indication of a first set of reference signals associated with a first transmit-receive point (TRP) of the second UE, an indication of a second set of reference signals associated with a second TRP of the second UE, and an indication to refrain from combining measurements based at least in part on the first set of reference signals with measurements based at least in part on the second set of reference signals;
measure the first set of reference signals from the second UE on the sidelink channel; and
measure the second set of reference signals from the second UE on the sidelink channel, wherein measurements based at least in part on the second set of reference signals are not combined with measurements based at least in part on the first set of reference signals.

23. The UE of claim 22, wherein the indication of the first set of reference signals includes at least one first measurement gap offset for the first set of reference signals, at least one first measurement gap period for the first set of reference signals, at least one second measurement gap offset for the second set of reference signals, and at least one second measurement gap period for the second set of reference signals, wherein the at least one first measurement gap offset is different from the at least one second measurement gap offset.

24. The UE of claim 22, wherein the indication of the first set of reference signals includes information identifying at least one first port for the first set of reference signals and at least one second port for the second set of reference signals.

25. The UE of claim 22, wherein the first set of reference signals and the second set of reference signals are multiplexed within one or more subframes or slots in a measurement period, and wherein the first set of reference signals and the second set of reference signals are multiplexed using time division multiplexing, code division multiplexing, frequency division multiplexing, or a combination thereof.

26. The UE of claim 22, wherein the memory and the one or more processors are further configured to:
transmit, to the second UE and based at least in part on measuring the first set of reference signals and measuring the second set of reference signals, at least one report calculated by the first UE, wherein results of measuring the first set of reference signals are not combined with results of measuring the second set of reference signals.

27. The UE of claim 26, wherein the at least one report includes a report with an index relating a first portion of the report to the first set of reference signals and a second portion of the report to the second set of reference signals.

28. The UE of claim 27, wherein the memory and the one or more processors are further configured to:
receive a signal, from the second UE, transmitted from both the first TRP and the second TRP; and
receive, from the second UE, sidelink control information (SCI), wherein the SCI includes an indication to combine decoded data from the signal transmitted from both the first TRP and the second TRP.

29. A method of wireless communication performed by a first user equipment (UE), comprising:
transmitting, to a second UE on a sidelink channel, a configuration message, wherein the configuration message includes: an indication of a first set of reference signals associated with a first transmit-receive point (TRP) of the first UE, an indication of a second set of reference signals associated with a second TRP of the first UE, and an indication to the second UE to refrain from combining measurements based at least in part on the first set of reference signals with measurements based at least in part on the second set of reference signals;
transmitting, using the first TRP of the first UE, the first set of reference signals to the second UE on the sidelink channel; and transmitting, using the second TRP of the first UE, the second set of reference signals to the second UE on the sidelink channel.

30. A method of wireless communication performed by a first user equipment (UE), comprising:
receiving, from a second UE on a sidelink channel, a configuration message, wherein the configuration message includes: an indication of a first set of reference signals associated with a first transmit-receive point (TRP) of the second UE, an indication of a second set of reference signals associated with a second TRP of the second UE, and an indication to refrain from combining measurements based at least in part on the first set of reference signals with measurements based at least in part on the second set of reference signals;
measuring the first set of reference signals from the second UE on the sidelink channel; and
measuring the second set of reference signals from the second UE on the sidelink channel, wherein measurements based at least in part on the second set of reference signals are not combined with measurements based at least in part on the first set of reference signals.

* * * * *